US012609516B2

(12) United States Patent
Schnelle

(10) Patent No.: US 12,609,516 B2
(45) Date of Patent: Apr. 21, 2026

(54) IN WALL UNIVERSAL PATHWAY SYSTEM

(71) Applicant: Travis Paul Schnelle, Springfield, MO (US)

(72) Inventor: Travis Paul Schnelle, Springfield, MO (US)

( * ) Notice: Subject to any disclaimer, the term of this patent is extended or adjusted under 35 U.S.C. 154(b) by 355 days.

(21) Appl. No.: 18/460,823

(22) Filed: Sep. 5, 2023

(65) Prior Publication Data
US 2025/0079818 A1      Mar. 6, 2025

(51) Int. Cl.
 *H02G 3/38*              (2006.01)
(52) U.S. Cl.
 CPC ................................... *H02G 3/386* (2013.01)
(58) Field of Classification Search
 CPC ........... H02G 3/08; H02G 3/081; H02G 3/22; H02G 3/14; H02G 3/10; H02G 3/128; H02G 3/12; H02G 3/121; H02G 3/105; H05K 5/00; H05K 5/02; H05K 5/0217; H05K 5/0247; H05K 5/03; H01R 13/46; H01R 13/53
 USPC .. 174/480, 481, 50, 53, 57, 58, 66, 67, 559, 174/496, 497, 498, 499, 495; 220/3.2–3.9, 4.02, 241, 242; 248/906, 49, 248/68.1, 74.1; 439/535, 536
 See application file for complete search history.

(56) References Cited

U.S. PATENT DOCUMENTS 3,472,945 A * 10/1969 Trachtenberg ......... H02G 3/081
                                                    174/53
4,599,485 A *  7/1986 Smolik ................... H02G 3/125
                                                    174/57
7,053,300 B2 *  5/2006 Denier ..................... H02G 3/18
                                                    174/58
8,084,687 B1 * 12/2011 Thurman ............... H02G 3/125
                                                    439/535
8,378,213 B1 *  2/2013 Gerardo ................... H02G 1/00
                                                    174/57
8,658,895 B1 *  2/2014 Gretz ..................... H02G 3/083
                                                    174/67
8,759,674 B2 *  6/2014 Korcz ..................... H02G 3/14
                                                    174/53
8,975,518 B1 *  3/2015 Gretz ..................... H02G 1/00
                                                    174/559
9,035,175 B2 *  5/2015 Korcz ..................... H02G 3/12
                                                    174/58
9,397,491 B2 *  7/2016 Birli ....................... H05K 7/183
9,531,177 B1 * 12/2016 Gretz ..................... H02G 3/14
12,074,418 B2 *  8/2024 Beristany ................. H02G 3/12

* cited by examiner

*Primary Examiner* — Angel R Estrada

(57) ABSTRACT

A universal pathway system for structured cabling built in-wall prior to drywall installation to allow for management of cables and future expansion of network or electrical drops allowing for high fiber count. The in-wall Universal Pathway system includes a junction box which is unique in its overall size and shape to accommodate a plurality of cables. The expandable/retractable flexible conduit is oversized to allow for a plurality of cables and future expansion of network needs. There is an improvement to a mud ring to accommodate the dynamic needs of the scope of work. Additionally, there is an improvement to a cover plate which can have multiple designs to accommodate the dynamic needs of the scope of work. Assembly of the system is simple and can be adjusted as the overall system is not limited in its placement as it is adjustable for various locations and height and depth of walls.

18 Claims, 23 Drawing Sheets

10

5

5

10

15 —

16

16

16 —

16

IN WALL UNIVERSAL PATHWAY SYSTEM

FIELD OF THE INVENTION

The present invention generally relates to low volt fiber/av/electrical, also known as structured cable, in-wall installation method capable of improving the ease of installation as well as expansion of future installation in the same junction box.

BACKGROUND OF THE INVENTION

Installation of low volt cabling has increased exponentially over the last twenty years due to the growth of technology and web-based systems. Rarely are the installation sites brand new buildings. Rather, the majority of installations take place at sites in which the building has been in existence for many years making the process of installation tedious, time consuming and difficult to manage while maintaining the integrity of the finished portions of the building. All too often, in order to avoid costly repairs to painted dry wall and other wall surfaces, installation of structured cable has to be remediated by use of surface mount conduit, known in the field as raceway. This can be unsightly, and the final product is easy to identify that installation has taken place.

If installation does take place during a new build, referred to in the industry as green field, it consists of a modified junction box and the structured cable is merely ran down from the ceiling area to the junction box, leaving the structured cable to hang freely only to be covered by an insulation that may be installed as the build progresses.

Currently, installation of structured cable in an existing building requires the removal of ceiling tiles to locate the best path from the main distribution frame to the drop area. This involves pulling or feeding the structed cable through a variety of insulation, around wood or metal studs, or any other obstacle that may have been added in later stages of the building. The drywall or other wall surface must then be cut into to create an opening for the junction box in which the structured cable is remediated and finished.

As a result, finding the path for the structured cable to the drop is time consuming for the installation which inevitably adds cost to the customer. The integrity of the wall is reduced due to the cut in area and any insulation in the walls can be negatively impacted as the cable is pulled down through the wall space. The cables above the ceiling often end up laying on top of the ceiling tiles, adding weight on the tiles, and are exposed to the sharp edges of the ceiling tile framework. As the cable is pulled through the wall and over the ceiling the protective sheath can be cut or shaved which will result in a loss of signal strength.

As of now, faceplates for network installation consist only of keystone ports and range from two, four, six, or eight ports and are limited in their size. This limits the ability to install a variety of structured cable in one junction box in one part of a room or office. Any additional drops that would be added in future installations would result in costly and time consuming work that would damage the integrity of the wall surface.

Therefore, there is a growing demand for ease of installation and management of cables, specifically but not limited to cat5, cat5e, cat6, fiber, audio/video, and electrical cables, as well as ease of access for future installation of cables as new demands arise on a given area in the site facility. Future installation costs are reduced as the time involved in accessing the existing junction boxes is easier, less intrusive, and cosmetically favorable.

SUMMARY OF THE INVENTION

The present invention provides an in-wall Universal Pathway system that allows for ease of management of structured cable in a new build environment. The system includes oversized junction boxes, flexible and expandable conduit, ninety-degree elbows, ceiling and floor plates, an improvement on a drywall adapter plate, also know as a mud ring, and an improvement on faceplates that attach to the oversized junction box and offer a plurality of options for network, audio/video, and electrical ports. Network cables and fiber, also known as structured cabling, are used for the purpose of creating data and communications networks within a facility. Often the scope of work is determined before installation with detailed specifications regarding the number of drops and ports needed throughout the facility. The number of devices in the facility dictates the number of drops and ports needed as well as the demand for electrical power and audio capabilities for the devices. While installation can be straight forward, the scope of work can change based on new demands by, or needs of, the tenant. The in-wall Universal Pathway system allows for a wide range of capabilities to include data, AV, and electrical as well as for future expansion after the initial installation is completed. Once the initial installation is complete any future expansion of data/av/electrical needs require major intrusive structural work or relying on the use of raceway conduit attached to the surface of a wall. The in-wall Universal Pathway system affords accessibility to any future data/AV/electrical installer as a clear pathway is already established and capable of holding a plurality of cables or electrical wiring.

In one embodiment, the present invention allows for oversized junction boxes for holding a plurality of data, AV, and electrical cables. The oversized nature of the junction box particularly lends itself to expansion of network demands as it can accommodate a plurality of cables.

In another embodiment, the present invention allows for pathways that contain the structured cable in secure channels. The pathways have the advantage of being at least 5.08 cm (two inches) in circumference and oval in nature and are flexible and expandable to meet the demand of the space from floor to ceiling where they are installed. The oversized nature allows for ease of pulling cables through the secure pathways and prevents any comingling with insulation or obstacles within the wall.

In another embodiment, the present invention allows for ninety-degree elbows to be installed above the ceiling or below the floor for management of the cables into the pathway system. The ninety-degree elbows give the advantage of a smooth route from a horizontal plane to a vertical plane.

In another embodiment, the present invention allows for the oversized junction box to be adjusted to meet the depth of the wall surface which can be drywall and/or brick or decorative rock surface.

In another embodiment, the present invention allows for an improvement on drywall adapter plates, also known as mud rings, which can vary based on the scope of the project.

In another embodiment, the present invention allows for an improvement on network faceplates. The improvement provides for a wide variety of network, audio/video, and electrical ports to be included on single faceplate.

Although specific features, structures, embodiments, methods, objectives, benefits, advantages, functionality, and applications may have been disclosed, it will be understood by those having skill in the art of structured cabling that changes, including but not limited to, variations, modifications, combinations, alterations, omissions, and various other applications, will occur to those of ordinary skill in the art and such changes will be made without departing from the spirit and the scope of the invention as claimed. It should also be understood by anyone who reads this document that the terminology and phraseology used herein are for the purpose of description and should not be considered limiting. The drawings illustrating embodiments of the present invention are used for schematic representation. The actual systems, devices, and methods of the embodiments of the present invention may depart from the foregoing schematics without departing from the spirit or the scope of the present invention.

BRIEF DESCRIPTION OF THE FIGURES

The object, features and advantages of the present invention will become more apparent by describing the preferred embodiments with reference to the accompanying figures, in which.

4

Figure 1:
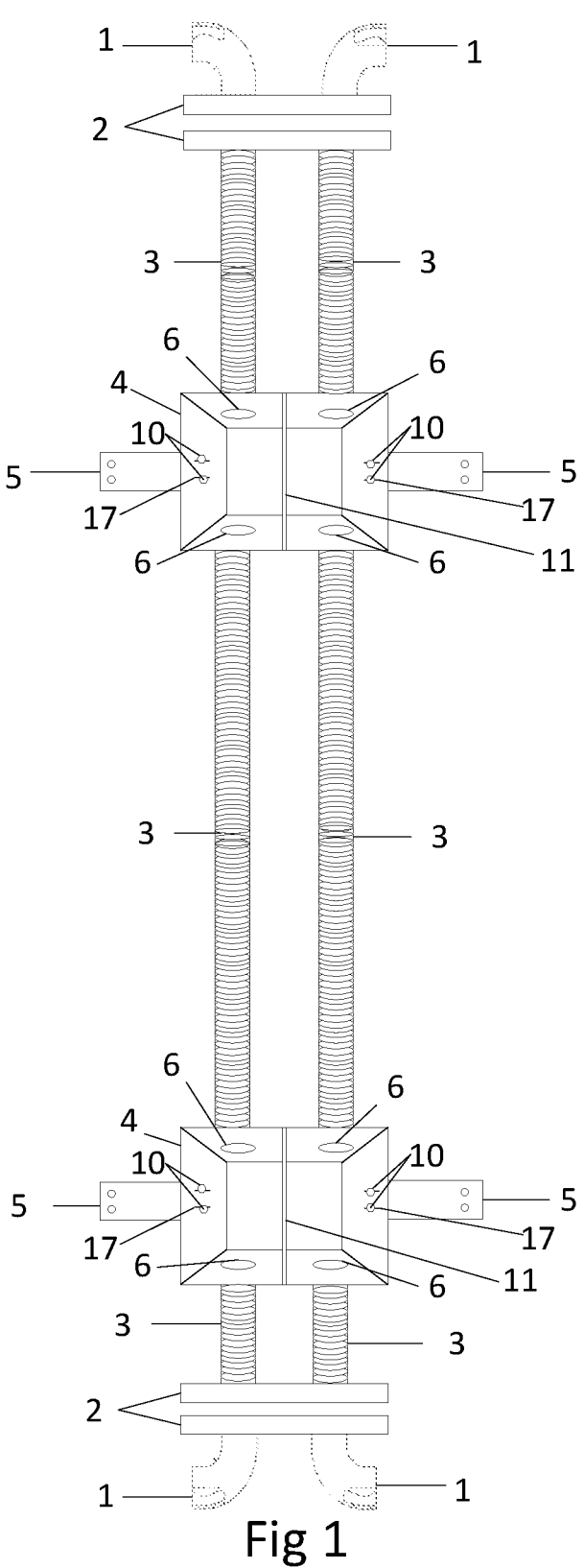
FIG. 1 illustrates the entire in-wall Universal Pathways system installed floor to ceiling, with a plurality of flexible conduits expanded to the desired height as to meet the demand of a single installation, without limitation in accordance with an embodiment of the present invention.
Figures 11, 11A:
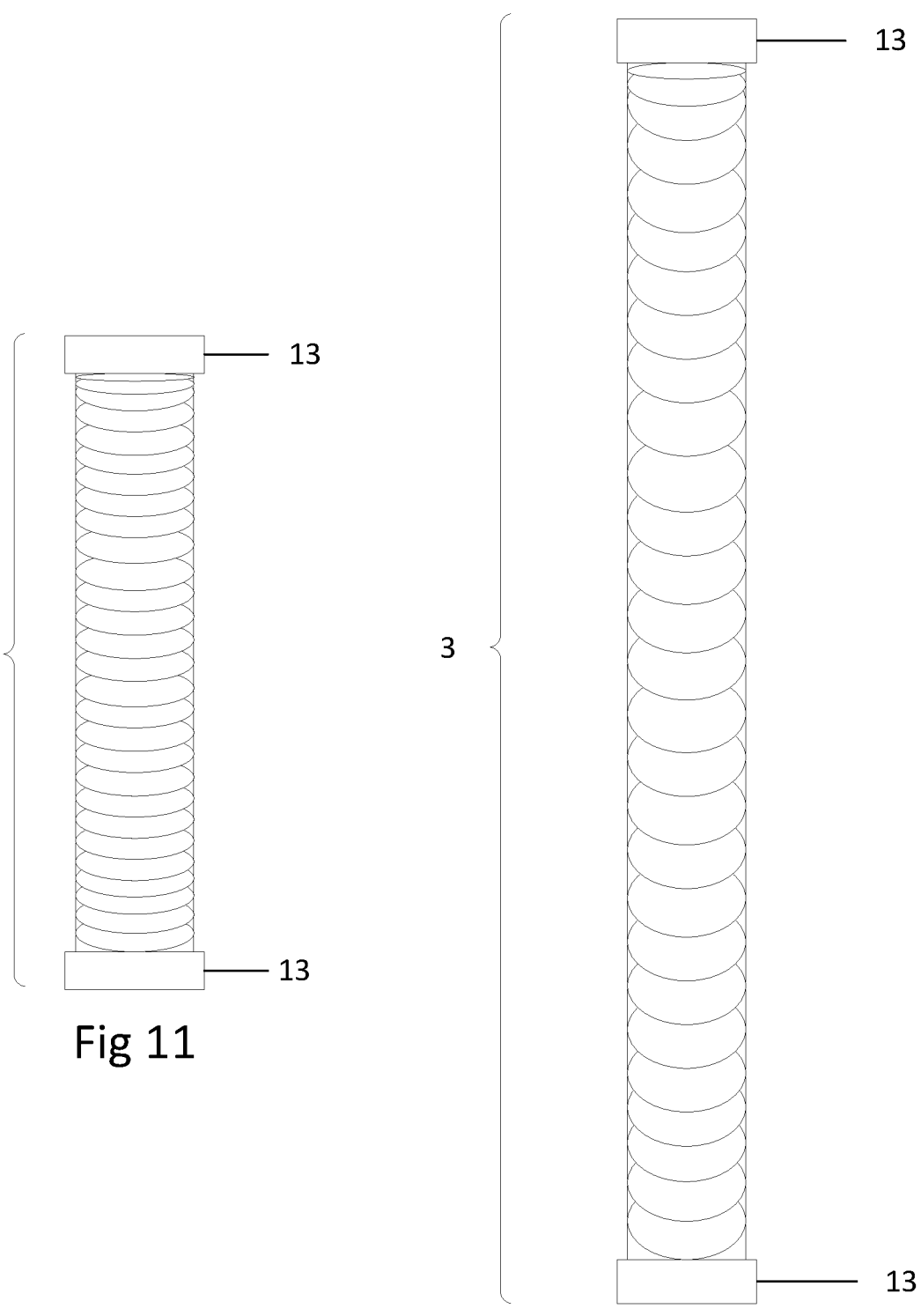

FIG. 11 illustrates an orthogonal view of the expandable/retractable flexible conduit and attachments of FIG. 1 in retracted position in accordance with an embodiment of the present invention.

FIG. 11A illustrates an orthogonal view of the expandable/retractable flexible conduit and attachments of FIG. 11 in expanded position in accordance with an embodiment of the present invention.

Figures 2, 2A:
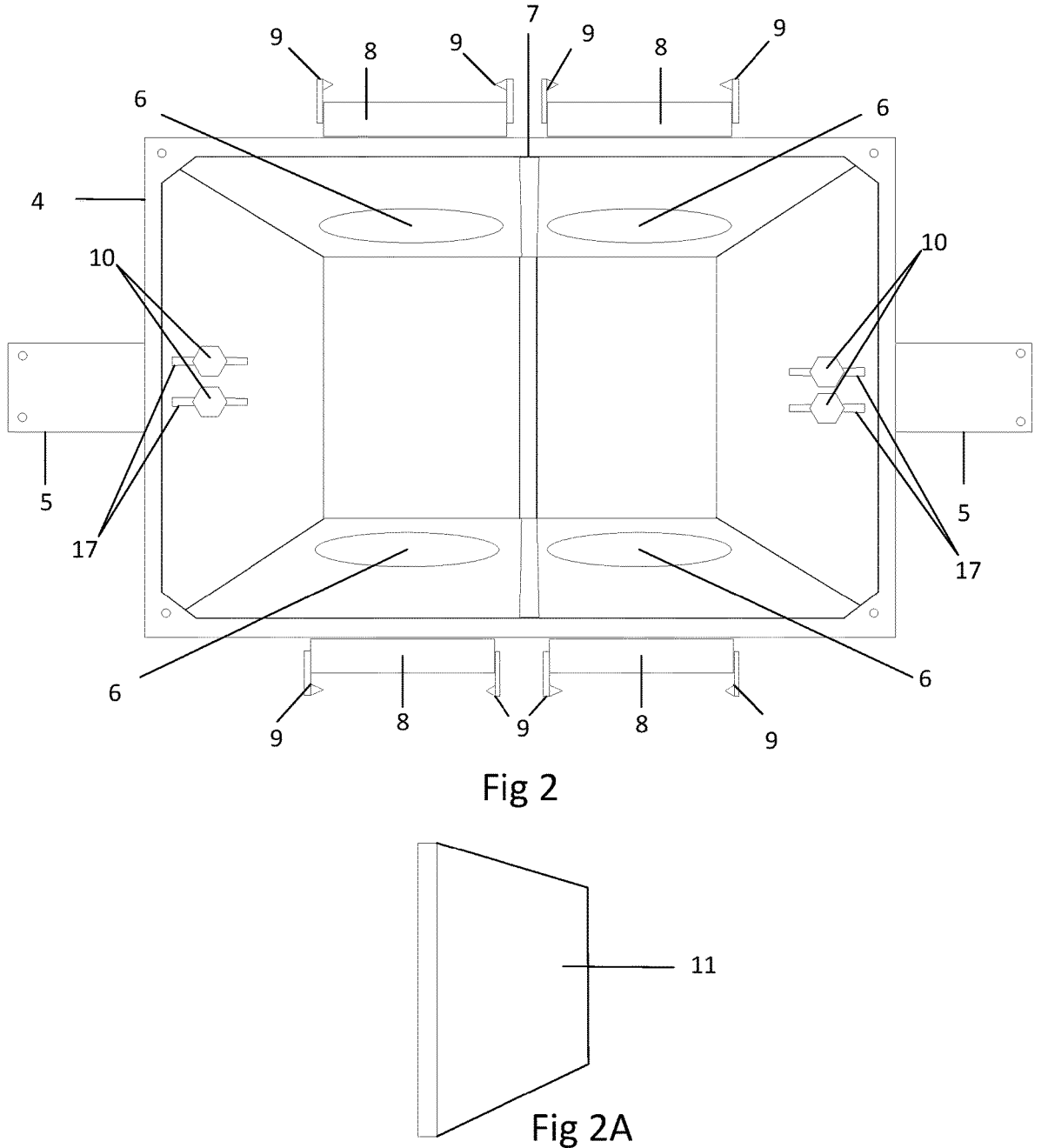
FIG. 2 illustrates a perspective view of the junction box with brackets of FIG. 1 in accordance with an embodiment of the present invention.
FIG. 2A illustrates a perspective view of the divider of FIG. 1 in accordance with an embodiment of the present invention.
Figure 12:
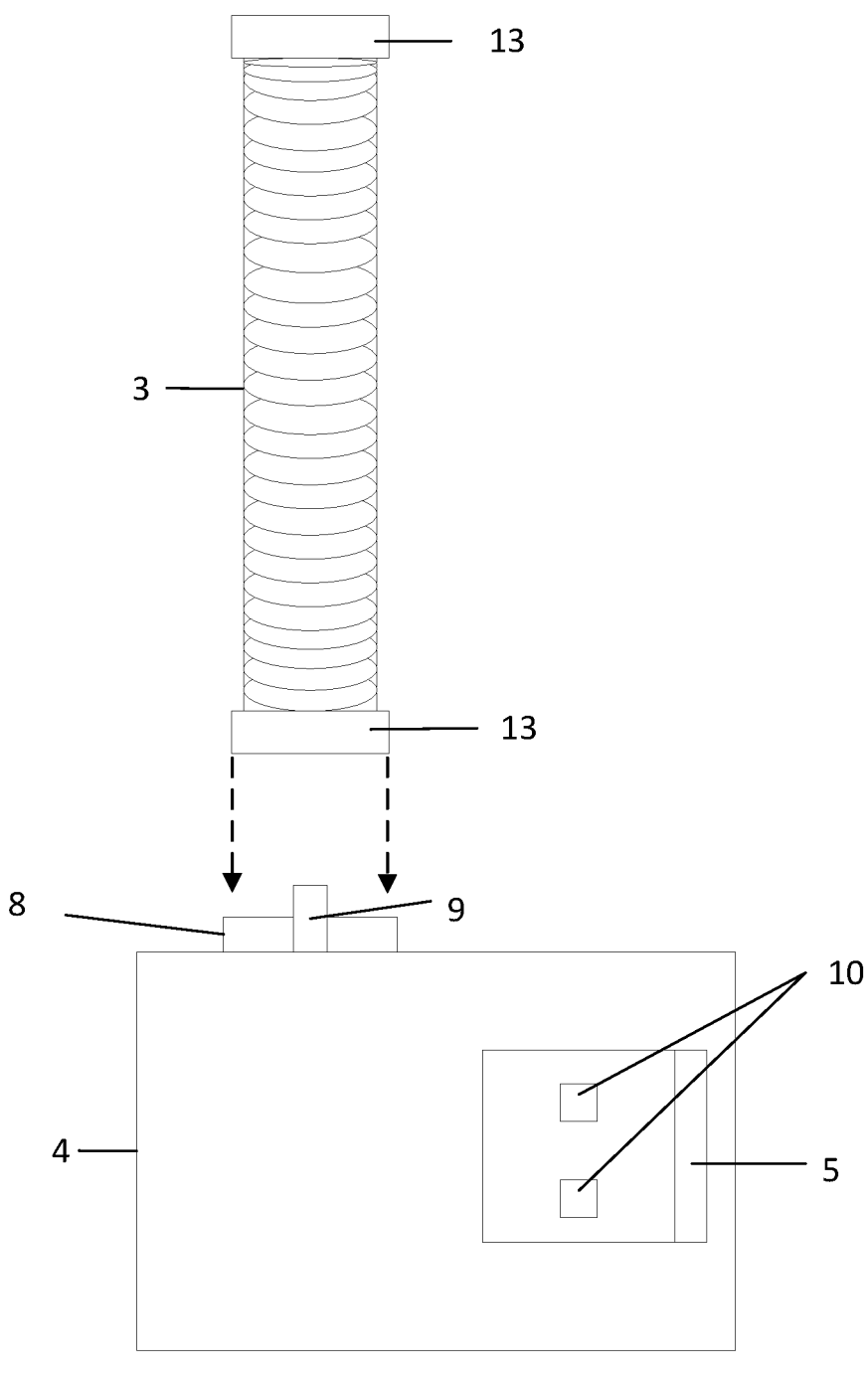

FIG. 12 illustrates an exploded view of the expandable/retractable flexible conduit of FIG. 11 and junction box of FIG. 2 in accordance with an embodiment of the present invention.

Figure 12A:
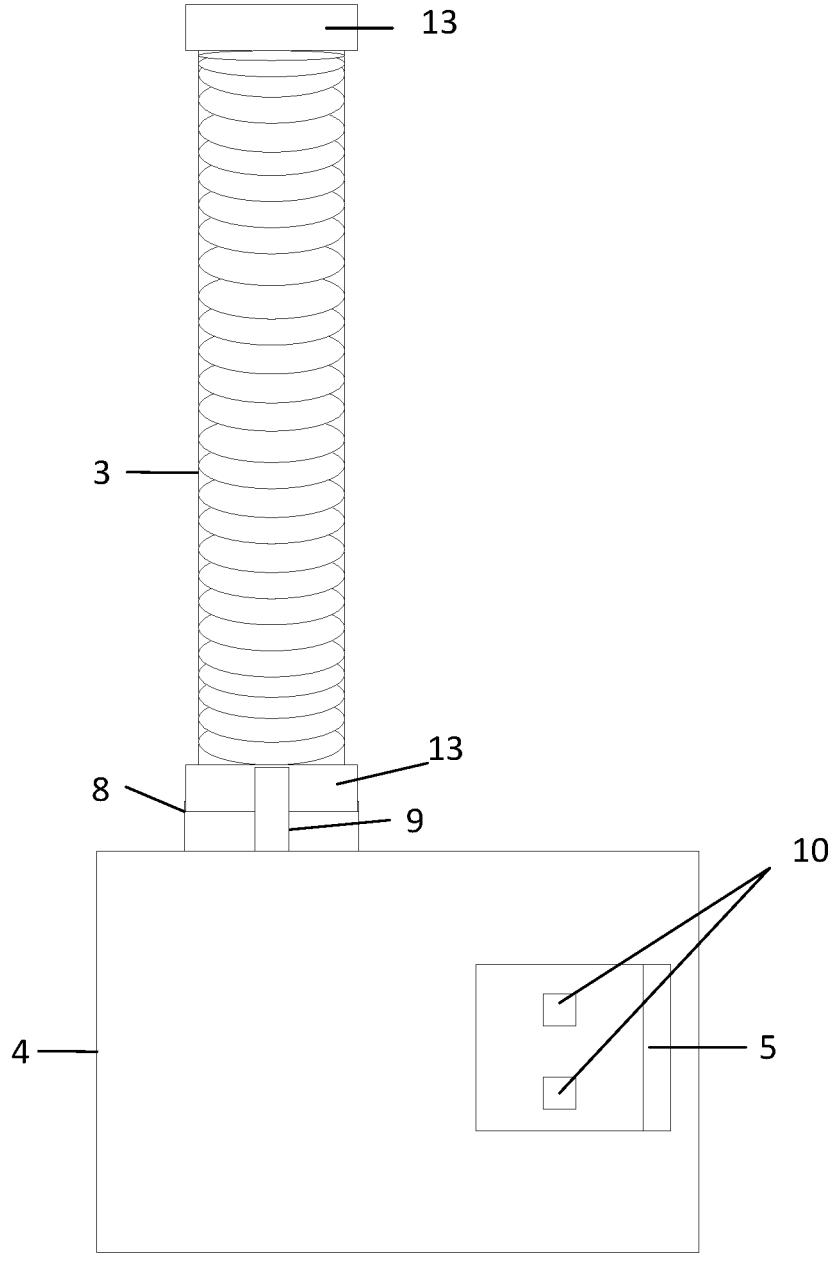

FIG. 12A illustrates a side orthogonal view of the expandable/retractable flexible conduit and junction box of FIG. 12 connected together in accordance with an embodiment of the present invention.

Figure 13:
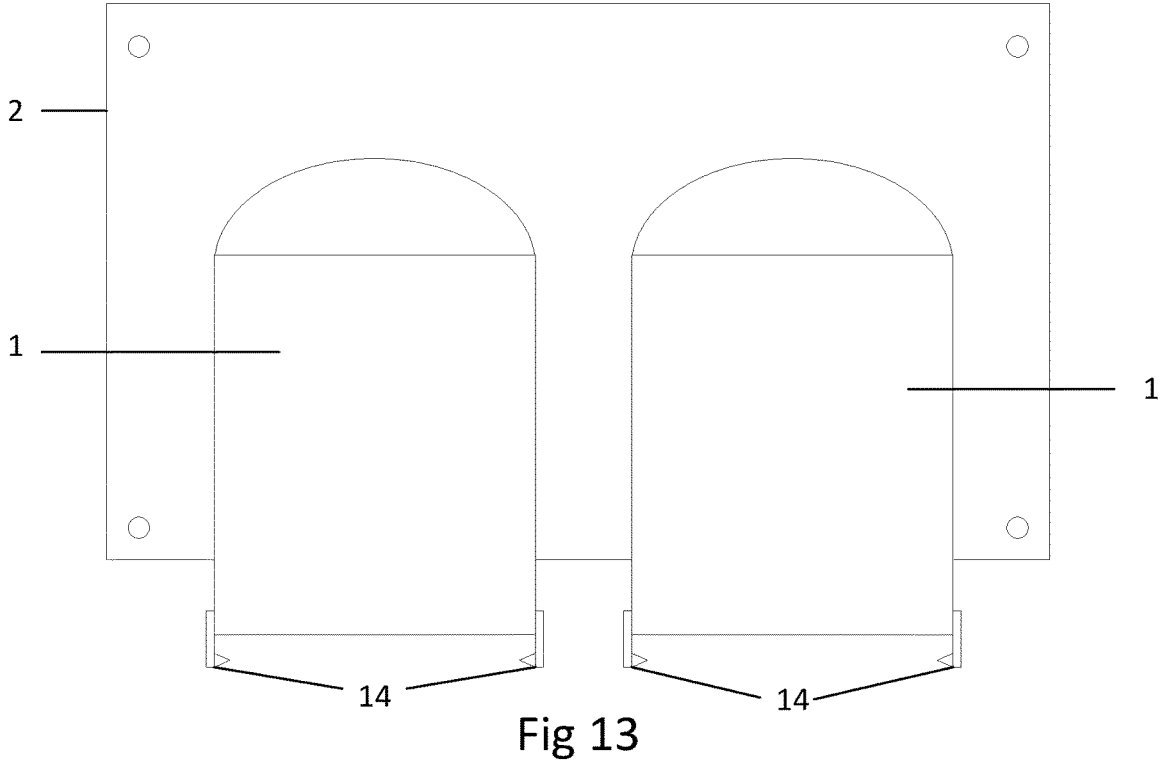

FIG. 13 illustrates an orthogonal view of the floor and/or ceiling plates and ninety-degree elbows and fasteners of FIG. 1 in accordance with an embodiment of the present invention.

Figure 14:
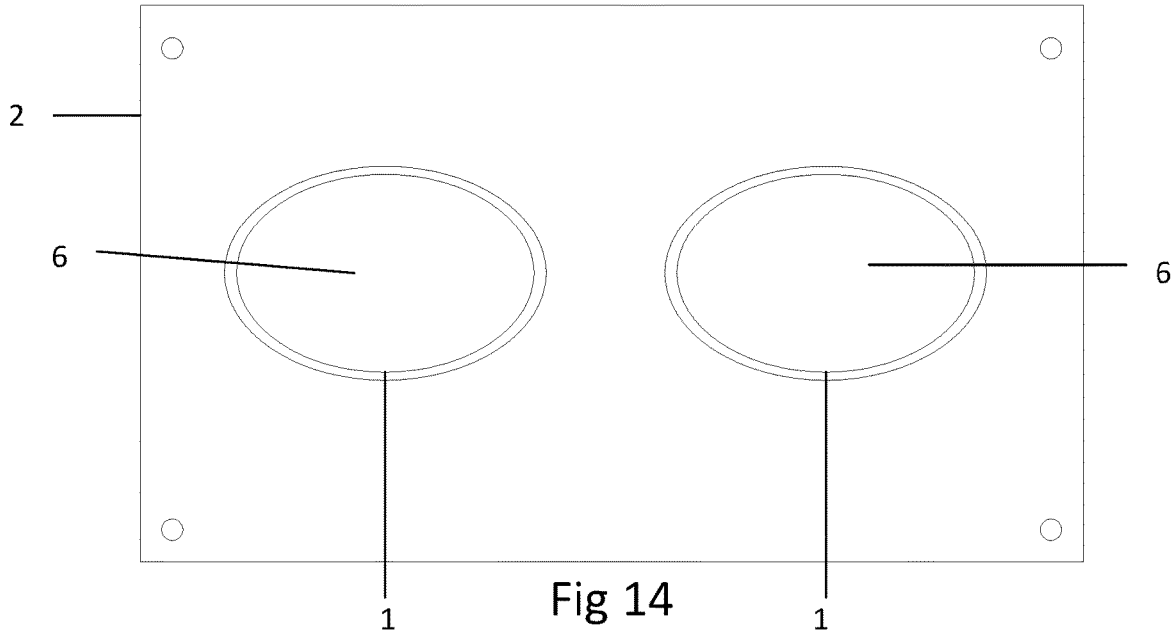

FIG. 14 illustrates an orthogonal view of the floor and/or ceiling plates of FIG. 13 to demonstrate the openings to the ninety-degree elbows in accordance with an embodiment of the present invention.

Figure 15:
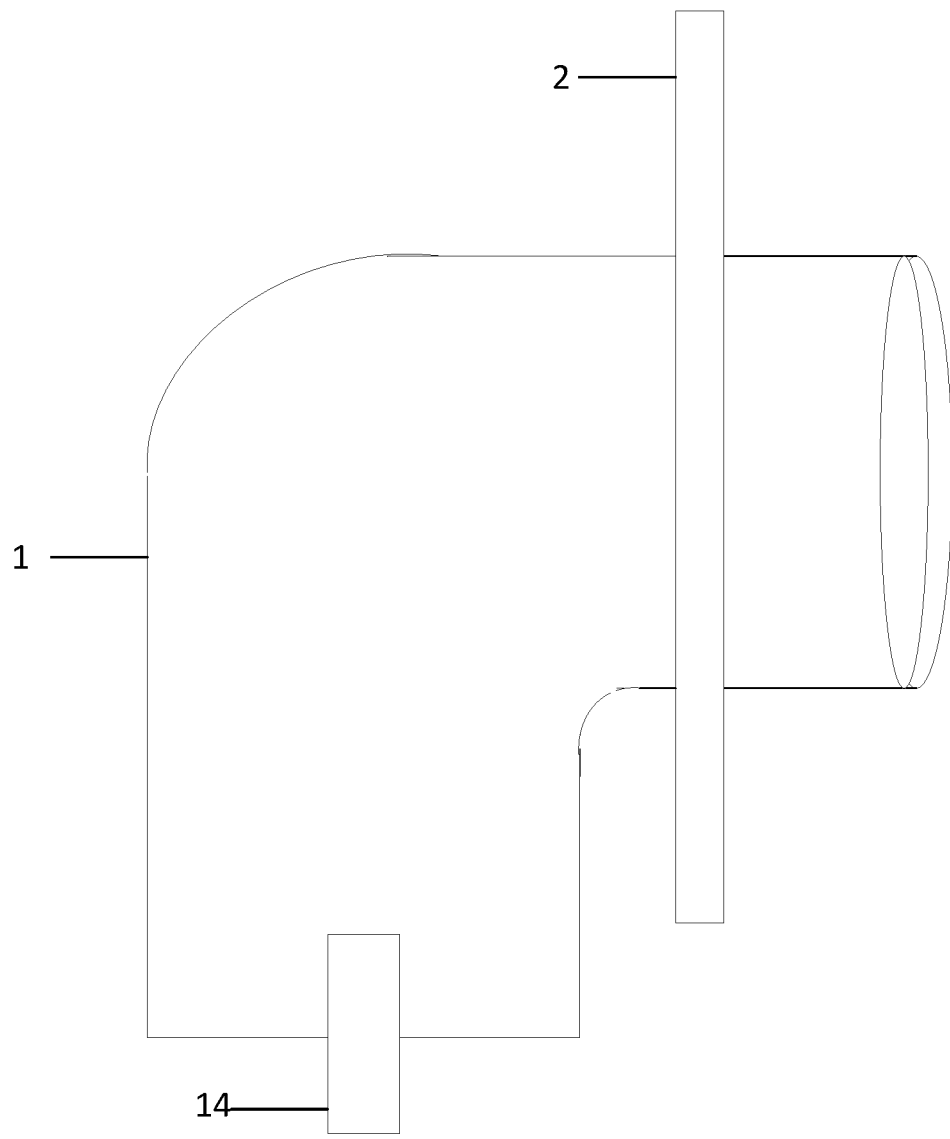

FIG. 15 illustrates a side orthogonal view of the floor and/or ceiling plates and ninety-degree elbows and fasteners of FIG. 13 in accordance with an embodiment of the present invention.

Figure 16:
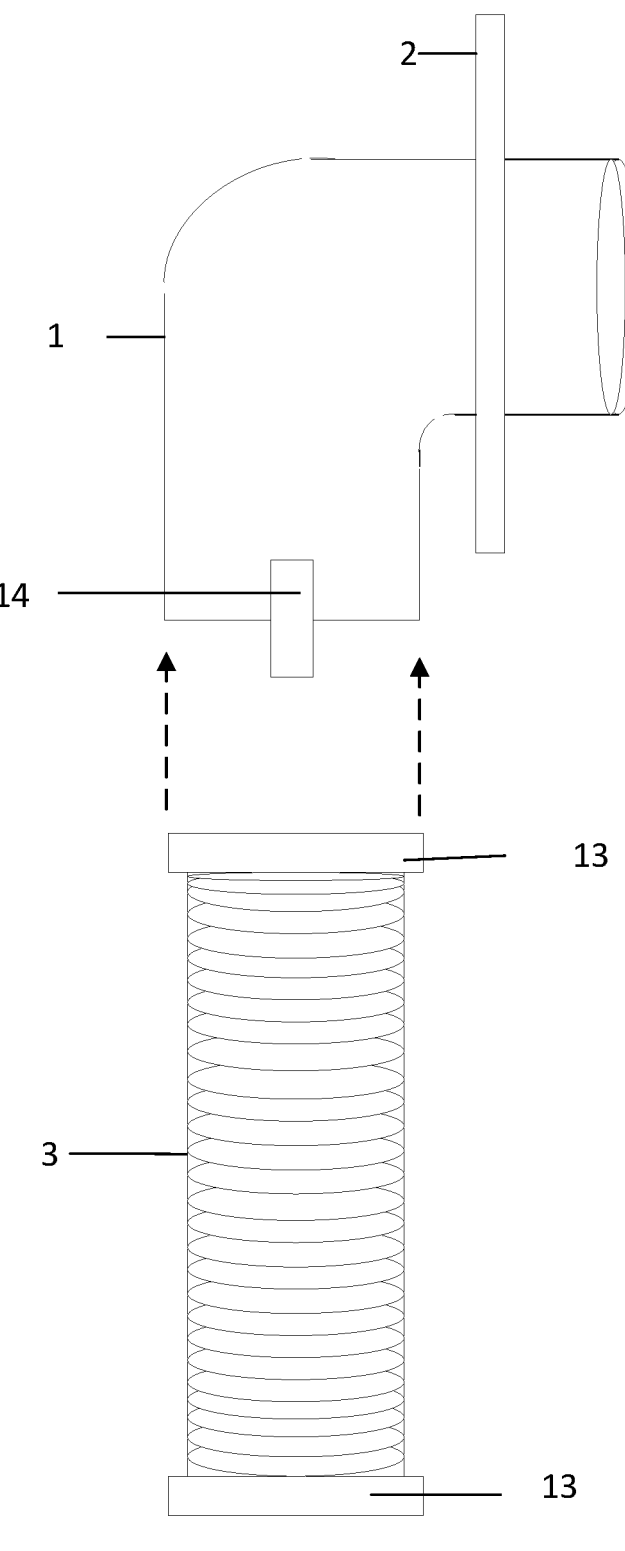

FIG. 16 illustrates an exploded view of the ninety-degree elbow of FIG. 13, the ceiling and/or floor plate of FIG. 13, and the expandable/flexible conduit of FIG. 11 in accordance with an embodiment of the present invention.

Figure 16A:
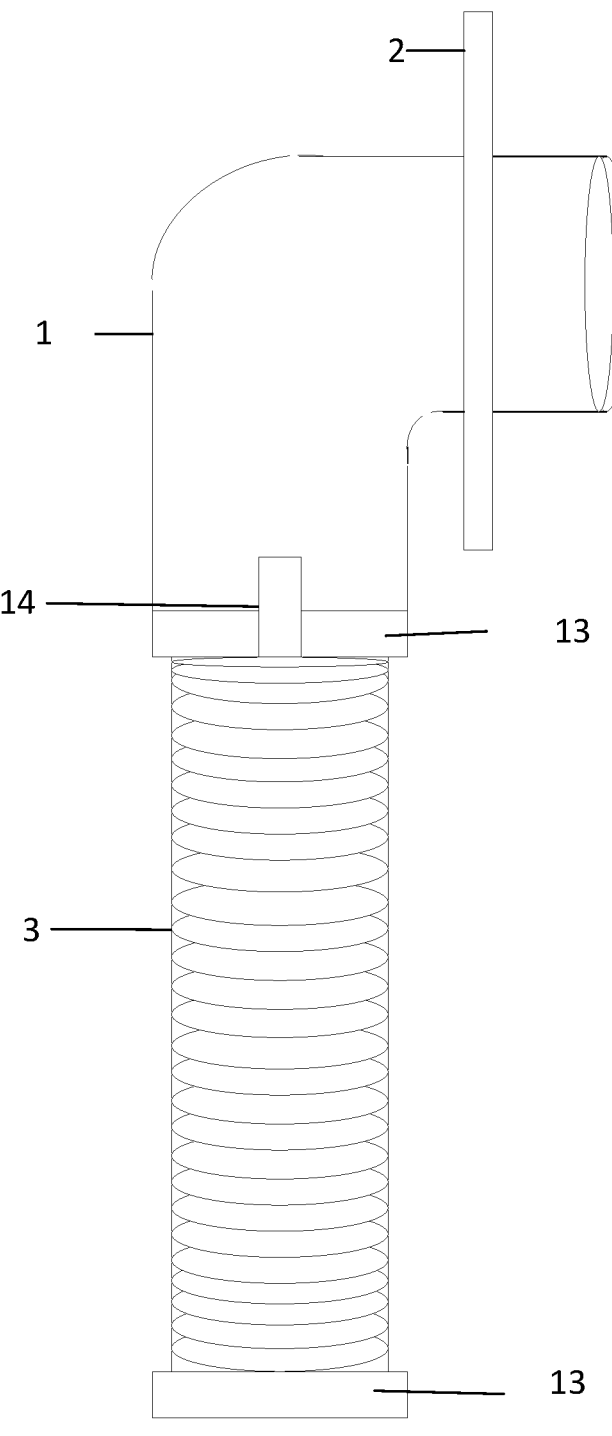

FIG. 16A illustrates a side orthogonal view of the ninety-degree elbow, the ceiling and/or floor plate, and flexible/expandable conduit of FIG. 16 connected together in accordance with an embodiment of the present invention.

Figure 17:
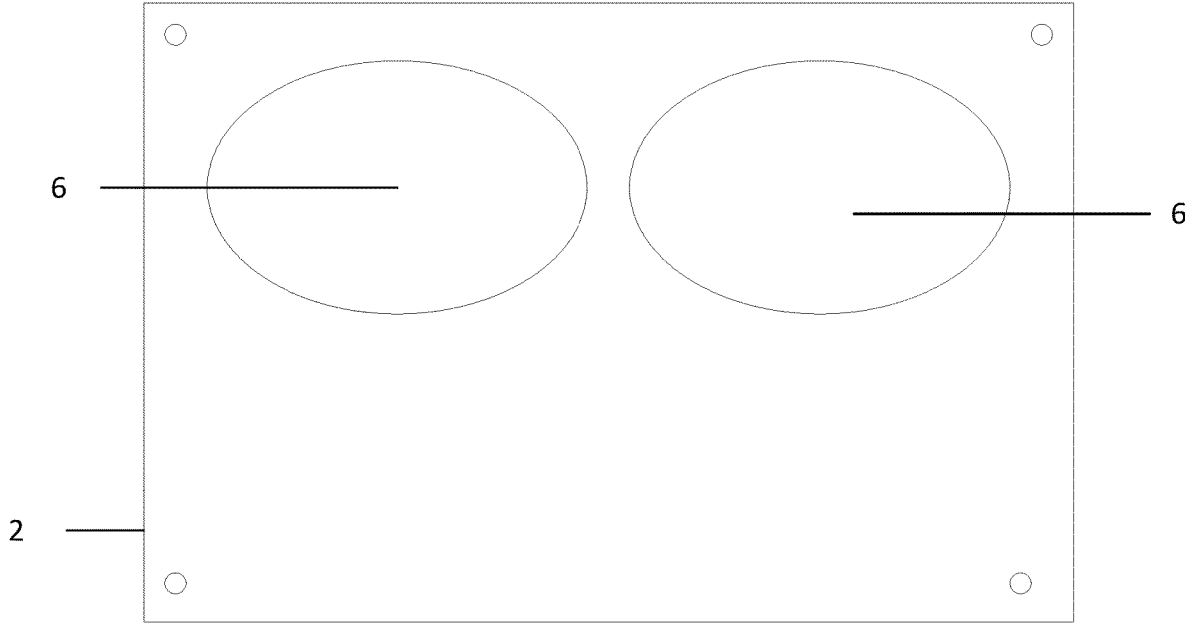

FIG. 17 illustrates an orthogonal view of the floor and/or ceiling plates where the ninety-degree elbows of FIG. 1 are inserted in accordance with an embodiment of the present invention.

Figure 17A:
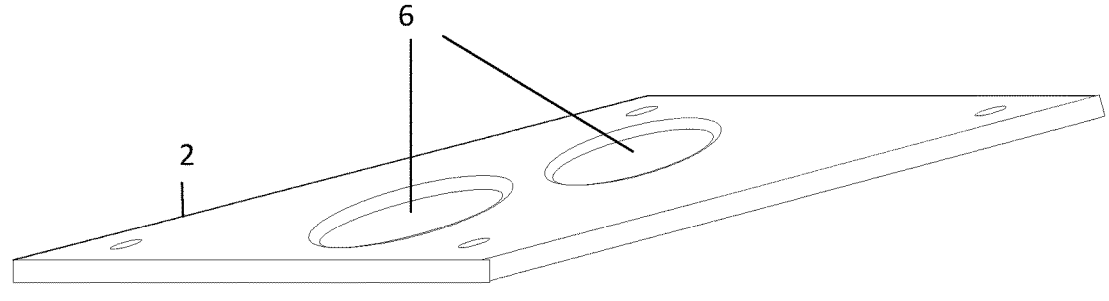

FIG. 17A illustrates a perspective view of the floor and/or ceiling plates of FIG. 17 in accordance with an embodiment of the present invention.

Figure 18:
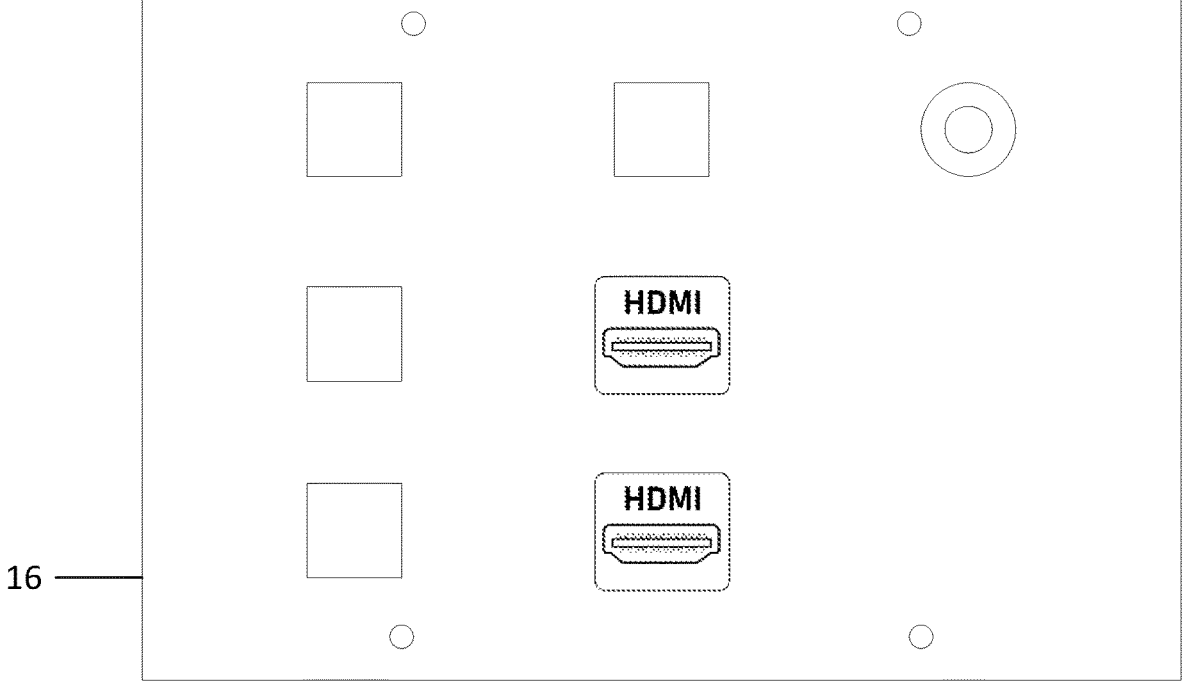

FIG. 18 illustrates an orthogonal view of an improvement on a cover plate and includes a variety of port openings in accordance with an embodiment of the present invention.

Figure 19:
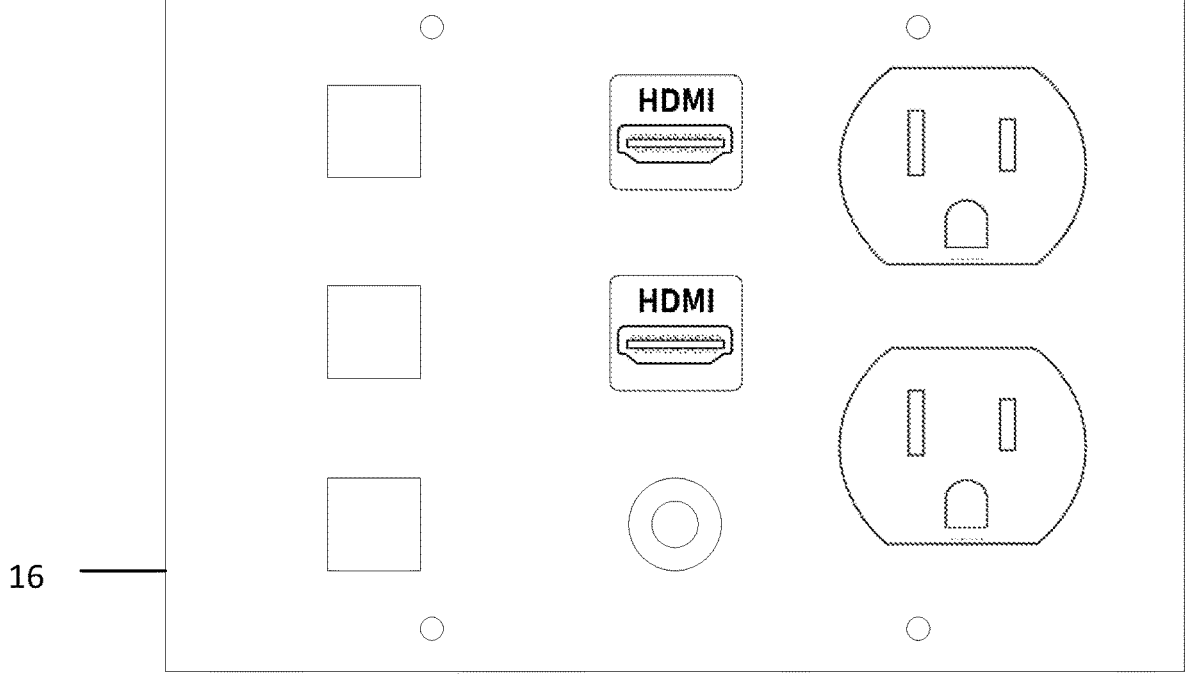

FIG. 19 illustrates an alternate orthogonal view of an improvement on the cover plate of FIG. 18 and includes a variety of port openings in accordance with an embodiment of the present invention.

Figure 20:
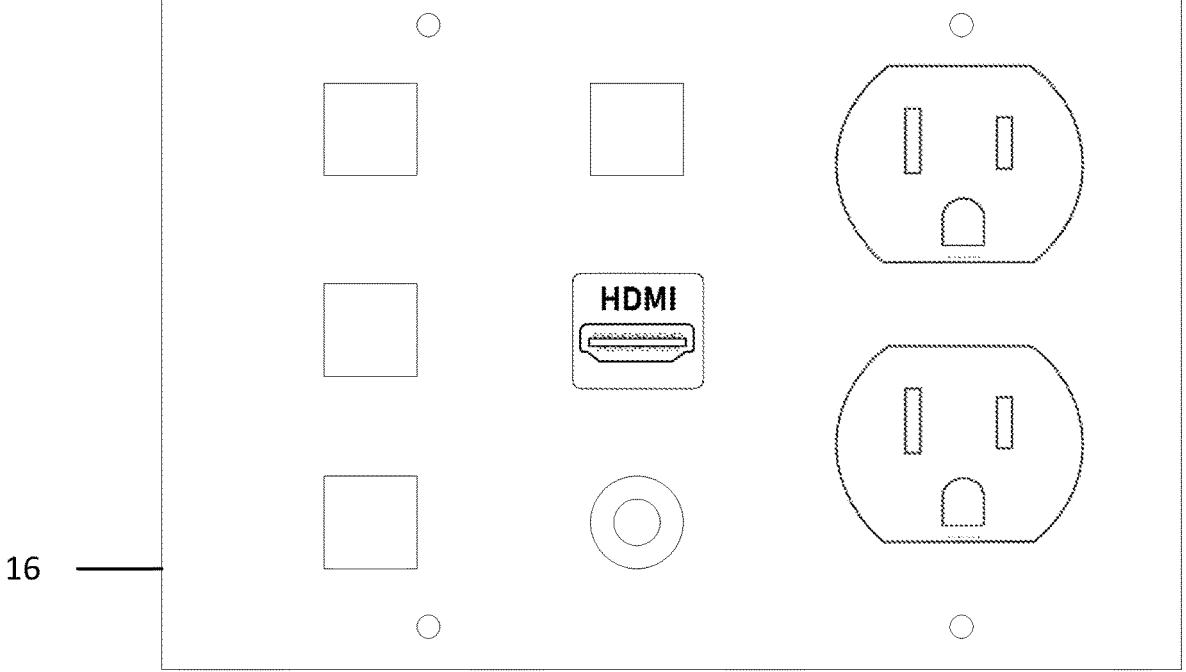

FIG. 20 illustrates an alternate orthogonal view of an improvement on the cover plate of FIG. 18 and includes a variety of port openings in accordance with an embodiment of the present invention.

Figure 21:
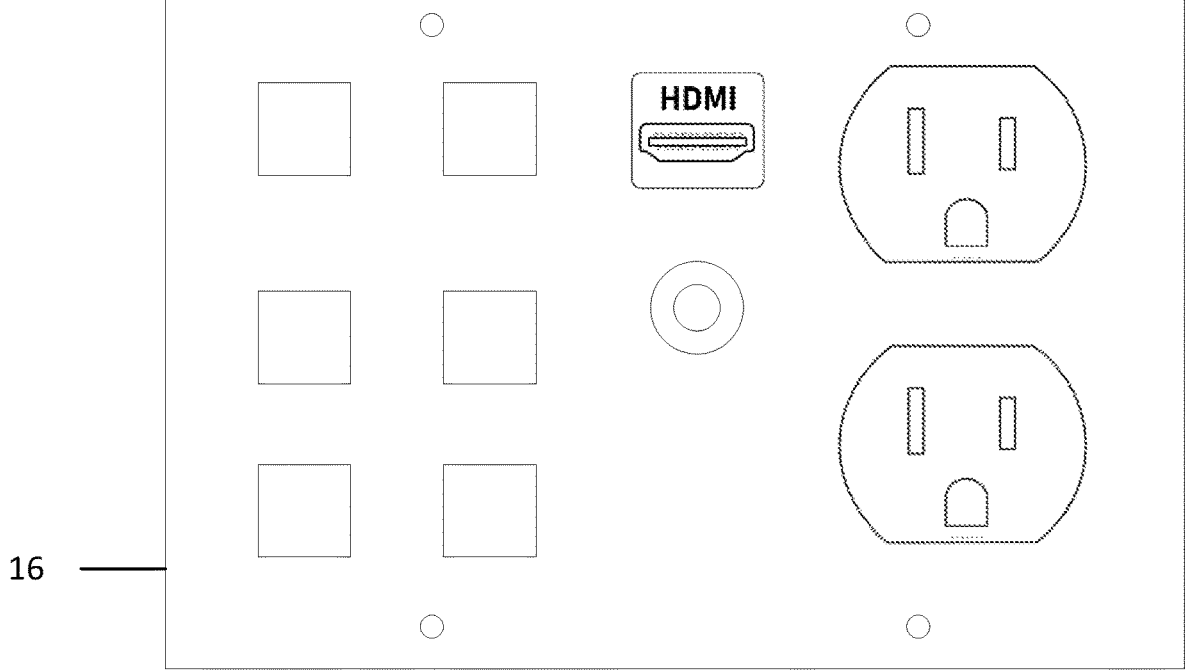

FIG. 21 illustrates an alternate orthogonal view of an improvement on the cover plate of FIG. 18 and includes a variety of port openings in accordance with an embodiment of the present invention.

Figure 22:
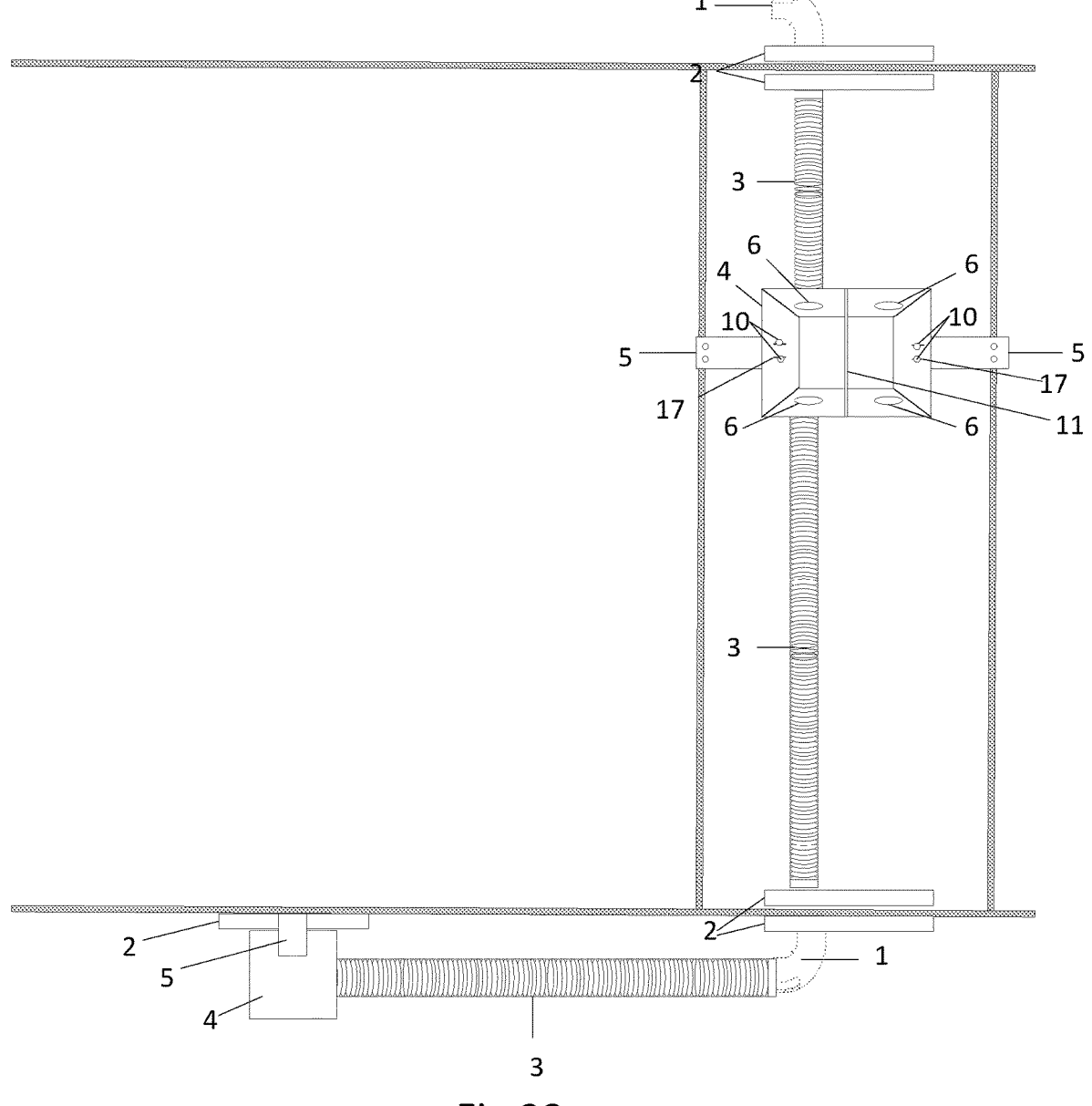

FIG. 22 illustrates an orthogonal view of an alternative implementation of the system and includes placement in wall and in floor for a variety of connections and demonstrates the non-limiting ability of the system in accordance with an embodiment of the present invention.

Figure 23:
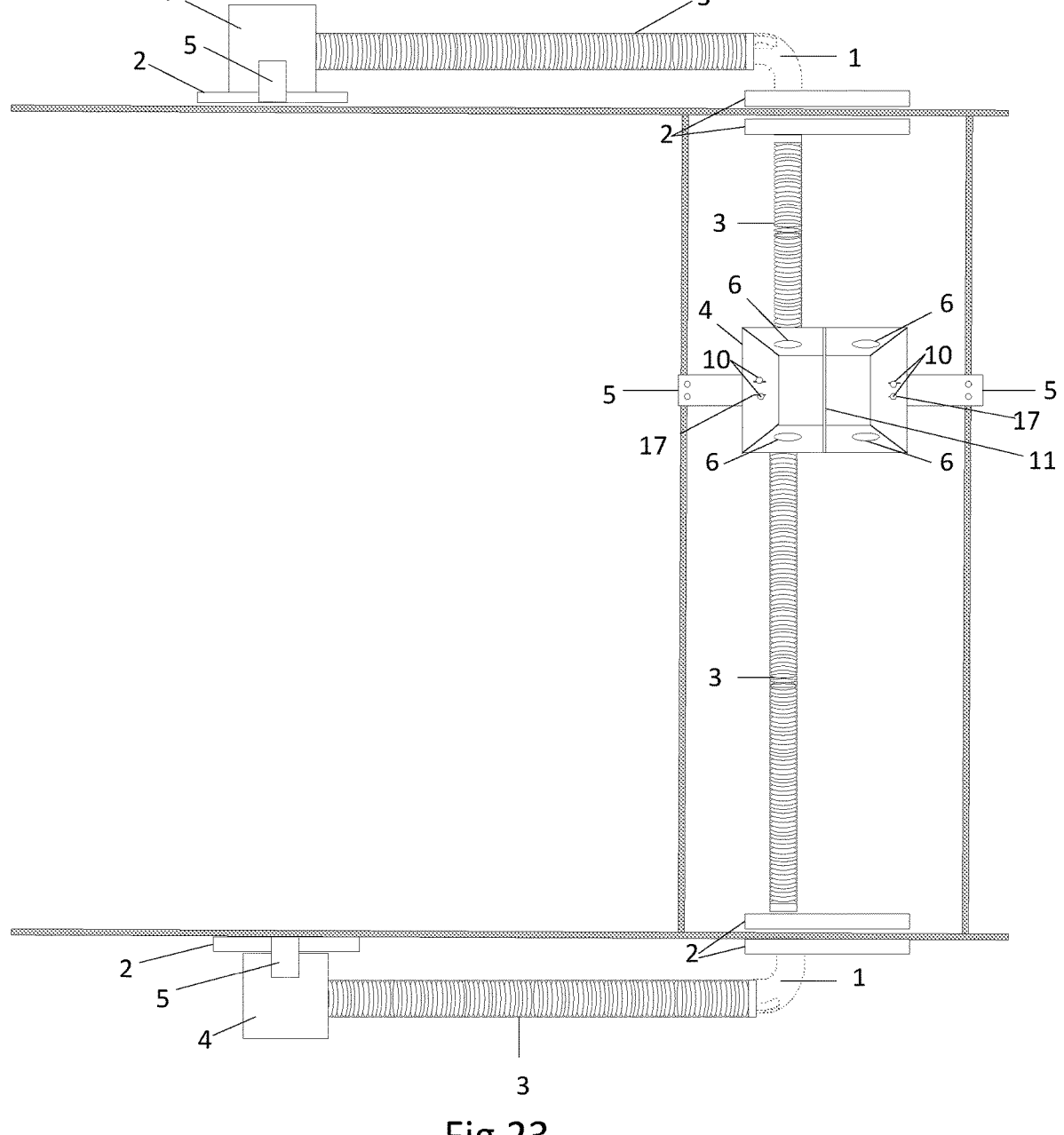

FIG. 23 illustrates an orthogonal view of an alternative implementation of the system and includes placement in wall, in ceiling, and in floor for a variety of connections and demonstrates non limiting ability of the system in accordance with an embodiment of the present invention.

Corresponding reference characters indicate corresponding parts throughout the drawings. The exemplification set of characters herein is not to be construed as limiting the scope of the invention in any manner.

DETAILED DESCRIPTION OF THE INVENTION

Embodiments of the present invention will now be described in detail with reference to the accompanying drawings, in which like reference numbers designate identical or corresponding elements in each of the different views. It is to be understood that changes can be made to these embodiments without departing from the spirit or the scope of the invention. Additionally, any details set forth in this specification are not intended to be limiting and instead simply set forth some of the many possible embodiments for the invention as claimed.

In one aspect, FIG. 1 shows an embodiment of the entire In-wall Universal Pathway system installed floor to ceiling, with a plurality of flexible conduits (3) expanded to the desired height as to meet the demand of a single installation, without limitation. While a pair of junction boxes (4) are shown as being installed on the upper and/or lower parts of the wall studs, the junction boxes (4) can be installed as to meet the demand and scope of installation. The junction boxes (4) are connected to wall studs by means of a plurality of brackets (5) to maintain a firm and consistent attachment and prevent accidental disconnection of cables. A plurality of openings, (6) oval in circumference, with breakouts, are included in the junction box (4) for a plurality of installation options. A plurality of floor and/or ceiling plates (2) allow for secure attachment of the entire pathway system to the floor and/or ceiling to maintain firm and consistent attachments and to prevent accidental loss of connection. A plurality of ninety-degree elbows (1) above the ceiling and/or below the floor allow for ease of feeding cables down through the ceiling or up through the floor, and into the flexible conduit (3) to the junction box (4).

Referring to FIG. 2 the junction box (4) is shown in perspective view, may be approximately 15.24 cm (six inches) in width, but in some embodiments, it may be as large as approximately 35.56 cm (fourteen inches) in width and approximately 10.16 cm (four inches) in depth and approximately 10.16 cm (four inches) to approximately 15.24 cm (six inches) in height and wherein the overall thickness is approximately 0.3175 cm (one-eighth of an inch), except wherein the front facing edge portion is approximately 0.635 cm (one-quarter inch) in thickness. Four threaded holes, one in each corner of the front facing portion, are used for the attachment of an improvement on drywall mud rings (7) (7A) or a drywall adapter plate (8), to the junction box (4). The junction box (4) may be made of pvc plastic but other materials may also be suitable. Attached to the junction box (4) as an adjustable piece are a plurality of brackets (5) forming a ninety-degree angle. The brackets (5) are attached to the junction box (4) by means of a nut and bolt component (10) which are inserted through a rectangular opening (17) on each side panel of the front facing portion of the junction box (4) to allow for adjustment of the depth of the junction box (4) in conjunction to the wall surface and wherein the opening is approximately 2.54 cm (one inch) in length and approximately 0.635 cm (one quarter of an inch) in height. A plurality of openings (6), oval in circumference, approximately 5.08 cm (two inches) in diameter and an overall circumference of 15.96 cm (6.28319 inches), are included in the top of the junction box (4) and a plurality of openings (6), oval in circumference, approximately 5.08 cm (two inches) in diameter and an overall circumference of 15.96 cm (6.28319 inches), are included in the bottom of the junction box (4) with break outs to allow for installation of cable through the flexible expandable conduit (3) floor to ceiling as desired. Attached to the top and bottom of the junction box (4) as a solid piece are a plurality of caps (8), oval in circumference, approximately 1.27 cm (one half inch) in height, with an inner diameter of approximately 5.08 cm (two inches) and an overall circumference of 15.96 cm (6.28319 inches), and an outer diameter approximately 5.715 cm (two and one-quarter inches) and an overall circumference of 17.954 cm (7.06858 inches), with breakouts, allowing the flexible conduit (3) to fit into the caps (8) and are secured by a plurality of fasteners (9), approximately 0.635 cm (one-quarter inch) in width and approximately 0.3175 cm (one-eighth inch) in thickness and approximately 2.2225 cm (seven-eighths inches) in height, on each side of the caps (8) to maintain the connection between the caps (8) and the flexible conduit (3). The caps and fasteners may be made of pvc plastic, but other materials may also be suitable. Breakouts are in place to prevent airflow and debris from entering the junction box (4). A groove (7) approximately 0.47625 cm (three-sixteenths of an inch) in width is embedded in the junction box (4) to allow for a divider (11) to be inserted, as needed, to separate low volt from high voltage installation and to prevent reduction or loss of signal.

Referring to FIG. 2A, the divider (11) is shown in perspective view, approximately 10.16 cm (four inches) to approximately 15.24 cm (six inches) in height and approximately 10.16 cm (four inches) in depth and approximately 0.3175 cm (one-eighth inch) in width, as an option to be inserted into the junction box (4) to separate low volt from high voltage installation as determined by the scope of work and to prevent reduction or loss of signal. The divider (11) may be made of pvc plastic, but other materials may also be suitable.

Figure 3:
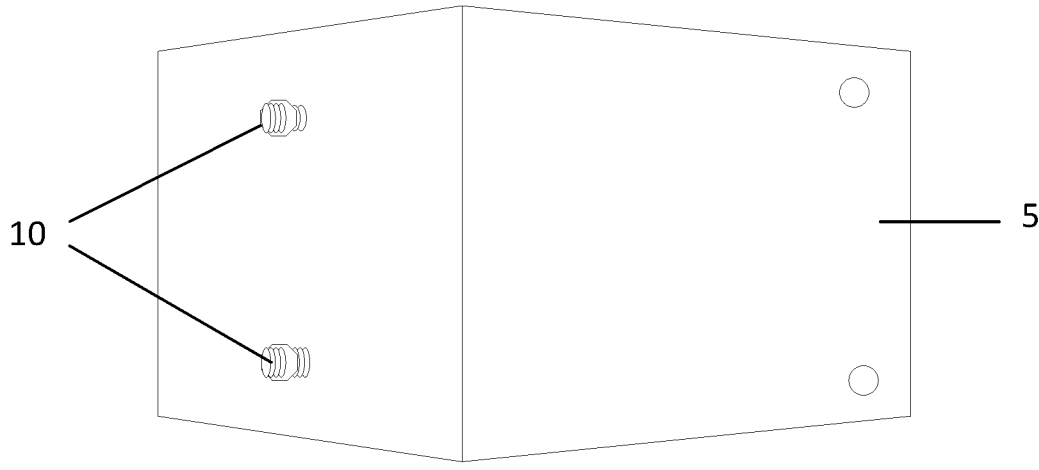
FIG. 3 illustrates a front perspective view of the brackets of FIG. 1 in accordance with an embodiment of the present invention.

Referring to FIG. 3 the ninety-degree brackets (5) are shown in front perspective view providing more detail with the catheti that attaches to the junction box (4) being approximately 5.08 cm (two inches) in length an approximately 5.08 cm (two inches) in height and approximately 0.3175 cm (one eighth of an inch) in thickness and includes a nut and bolt component (10) for assembly to the junction box (4) with the bolt approximately 1.905 cm (three-fourths of an inch) in length and 0.635 cm (one quarter of an inch) in diameter. The nut will be of sufficient size to correspond to the diameter of the bolt for a secure connection to the junction box (4). The brackets (5) may be made of galvanized steel, but other materials may also be suitable.

Figure 3A:
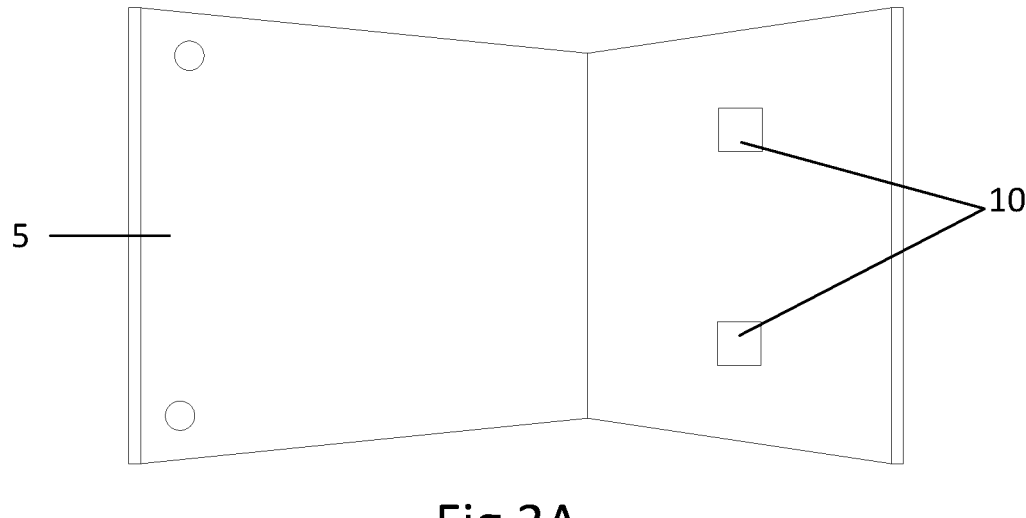
FIG. 3A illustrates rear perspective view of the brackets of FIG. 3 in accordance with an embodiment of the present invention.

Referring to FIG. 3A the ninety-degree brackets (5) are shown in rear perspective view wherein the distal end of the bolt (10) is flat to ensure a flush fitting against the wall stud as needed. The catheti for management to the wall studs being approximately 5.08 cm (two inches) in length but can be approximately 12.7 cm (five inches) in length and approximately 5.08 cm (two inches) in height and approximately 0.3175 cm (one-eighth of an inch) in thickness and wherein are a plurality of predrilled holes for management to the wall studs. The brackets (5) may be made of galvanized steel, but other materials may also be suitable.

Figure 4:
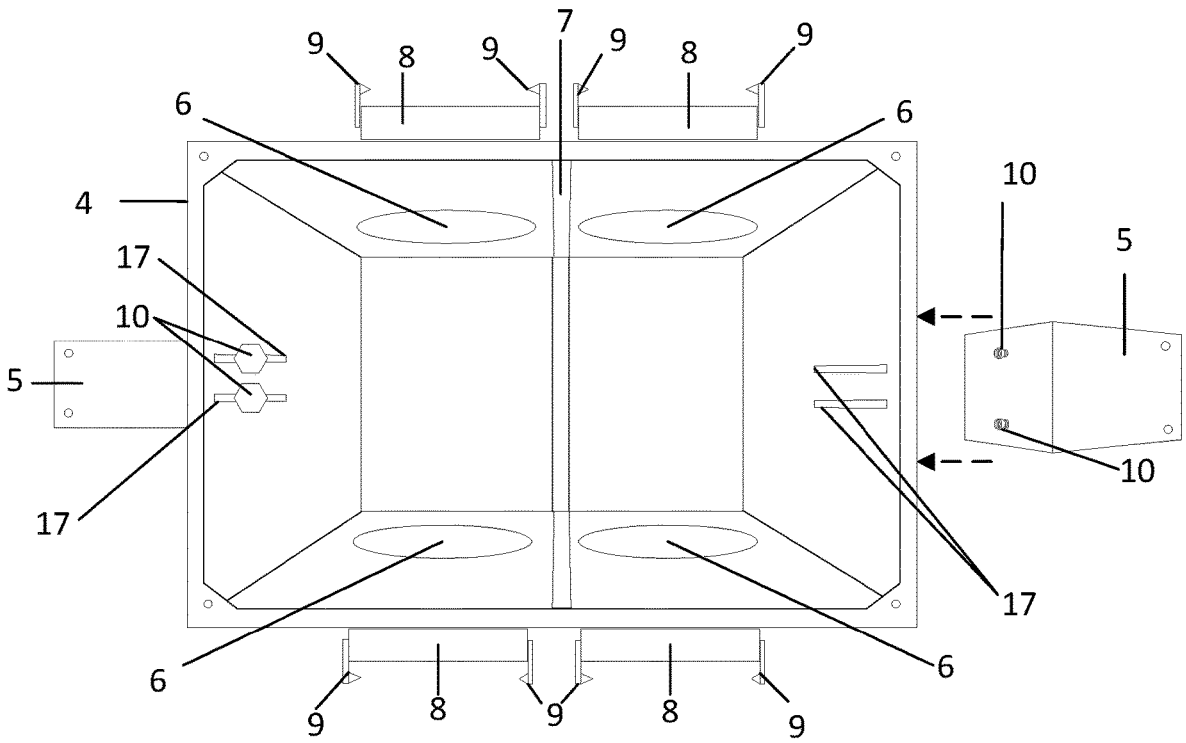
FIG. 4 illustrates an exploded view of the junction box of FIG. 2 and the brackets of FIG. 3 in accordance with an embodiment of the present invention.

Referring to FIG. 4 the junction box (4) and ninety-degree brackets (5) are shown in exploded view to demonstrate the connection of the ninety-degree brackets (5) to the junction box (4) by means of a nut and bolt component (10) attached to the junction box (4) for a secure connection.

Figures 5, 6:
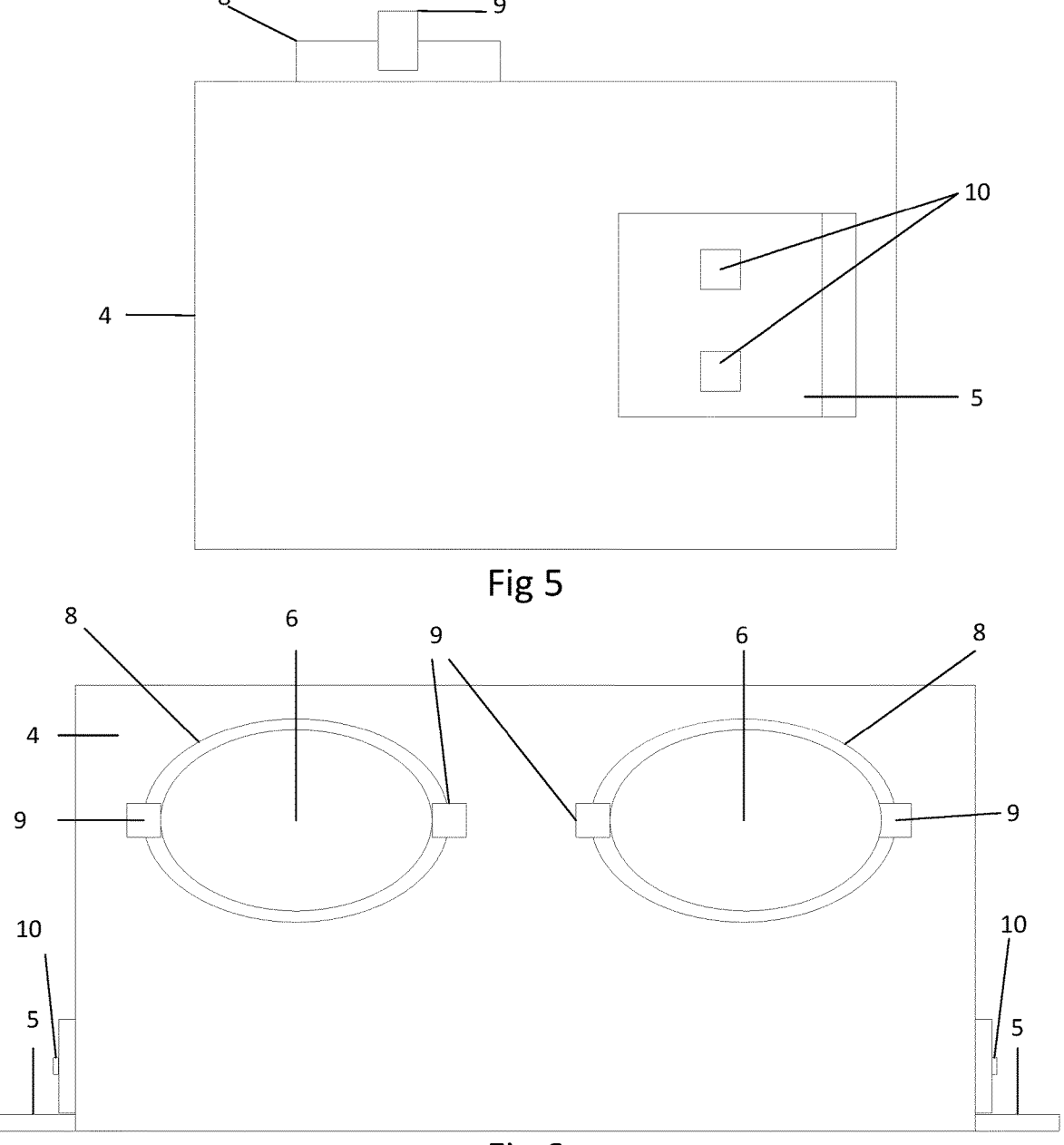
FIG. 5 illustrates a side orthogonal view of the junction box, cap, fastener, and bracket of FIG. 2 in accordance with an embodiment of the present invention.
FIG. 6 illustrates a top orthogonal view of the junction box, caps, fasteners, and brackets of FIG. 2 in accordance with an embodiment of the present invention.

Referring to FIG. 5 the junction box (4) is shown in side orthogonal view, providing more detail of the location of the caps (8) and the fasteners (9). This location shows the depth of the junction box (4) of approximately 10.16 cm (four inches), which allows for a plurality of cables. The location of the brackets (5) exhibits the ability of the junction box (4) to be adjustable to the wall studs to correspond to the finished wall surface to include, but not limited to, drywall or sheetrock.

Referring to FIG. 6 the junction box (4) is shown in top orthogonal view, providing more detail of the location of the oval breakouts (6), the caps (8), the fasteners (9), brackets (5), and the nut and bolt component (10).

Figure 7:
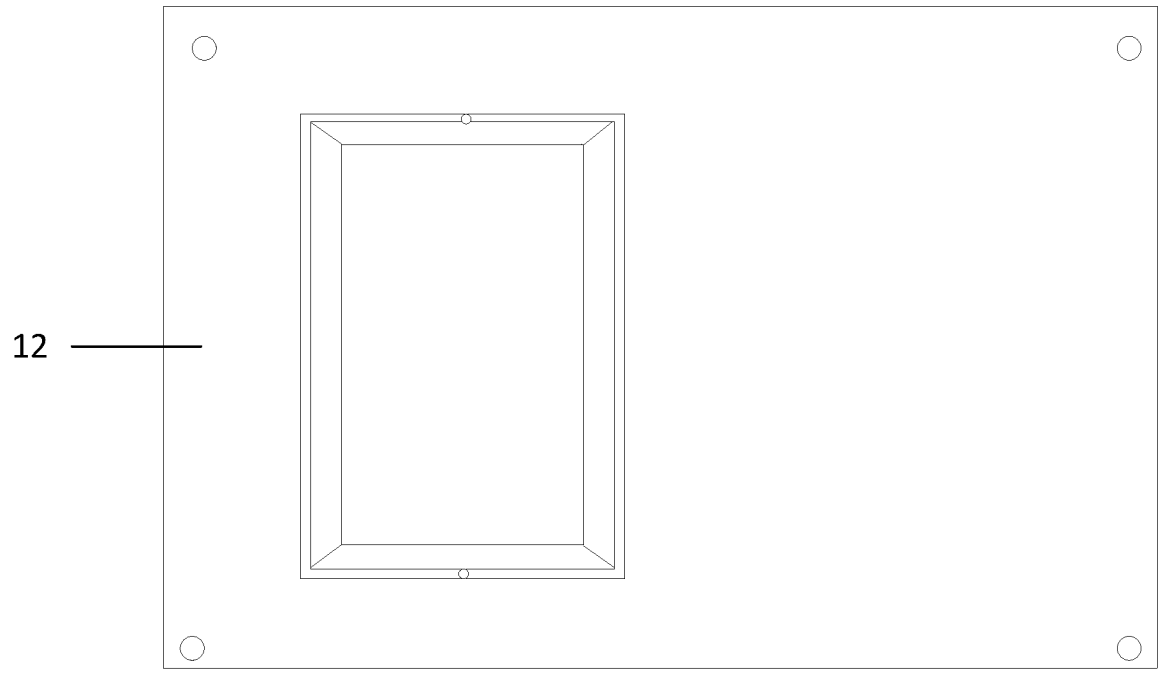
FIG. 7 illustrates an orthogonal view of an improvement on a drywall mud ring in accordance with an embodiment of the present invention.

Referring to FIG. 7 the embodiment of an improvement on a mud ring (12) with a plurality of predrilled holes for attachment to the junction box (4) is shown in orthogonal view. The overall size of the mud ring will correspond to the dynamic size of the junction box (4) as described above to meet the demands of a specific job requirement. The opening of the mud ring corresponds in size to a traditional face plate of 11.43 cm (four and one half inches) in length and 6.985 cm (two and three-fourths inches) in width which demonstrates the dynamic ability of the system to work with standard face plates.

Figure 7A:
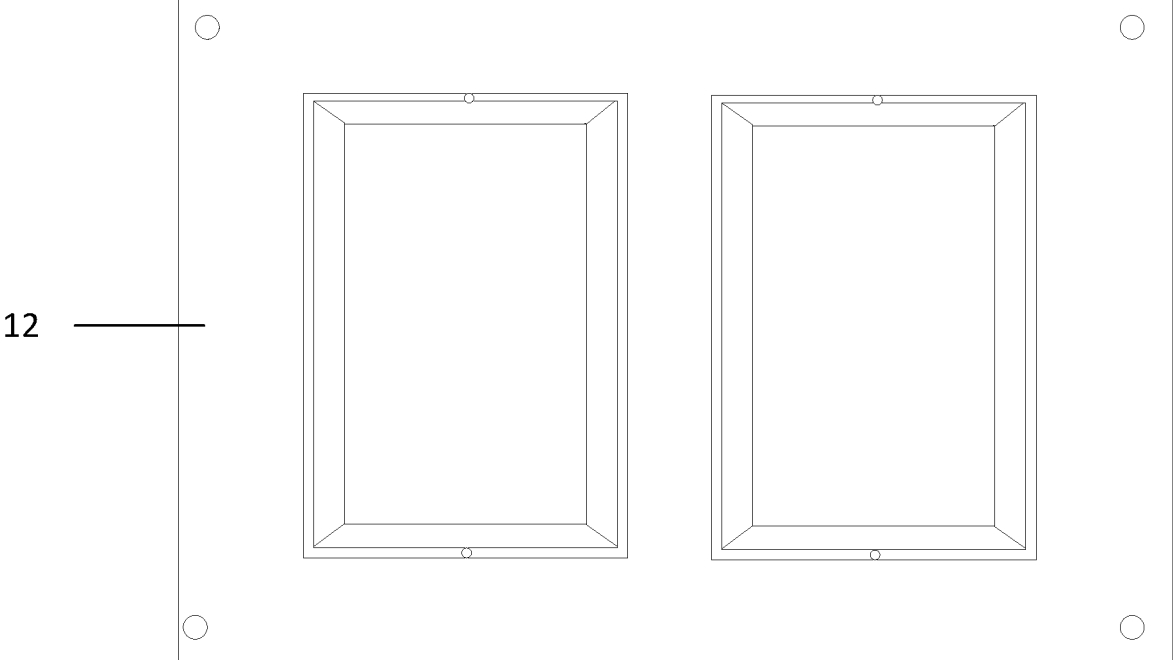
FIG. 7A illustrates an alternate orthogonal view of an improvement on a drywall mud ring in accordance with an embodiment of the present invention.

Referring to FIG. 7A, the embodiment of an improvement on a mud ring (12) with a plurality of predrilled holes for attachment to the junction box (4) is shown in orthogonal view. The overall size of the mud ring (12) will correspond to the dynamic size of the junction box (4), as described above, to meet the demands of a specific job requirement. The openings of the mud ring correspond in size to a traditional face place of 11.43 cm (four and one half inches) in length and 6.985 cm (two and three-fourths inches) in width which demonstrates the dynamic ability of the system to work with standard face plates.

Figure 8:
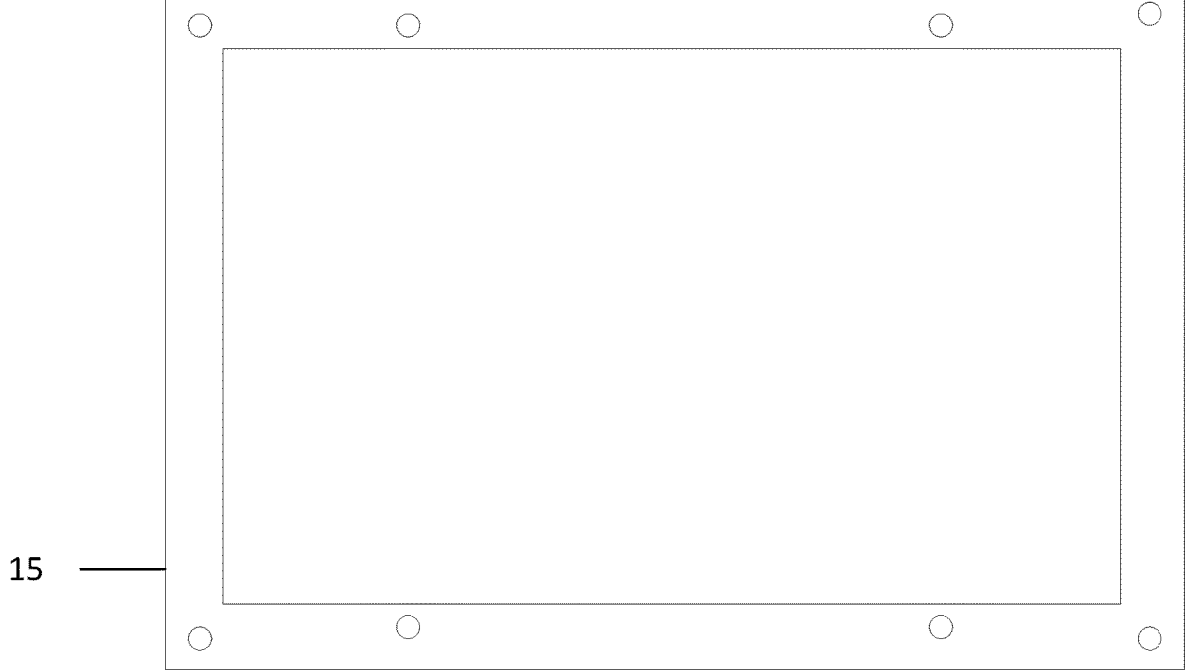
FIG. 8 illustrates an orthogonal view of a modified drywall adapter plate.

Referring to FIG. 8 the embodiment of a drywall adapter plate (15) with a plurality of predrilled holes for attachment to the junction box (4) is shown in orthogonal view. The overall size of the drywall adapter plate (15) will correspond to the dynamic size of the junction box (4), as described above, to meet the demands of a specific job requirement. The drywall adapter plate (15) is designed to work with an improvement on a faceplate (16) that is oversized in nature and designed for a plurality of structured cable/AV/electrical cabling.

Figure 9:
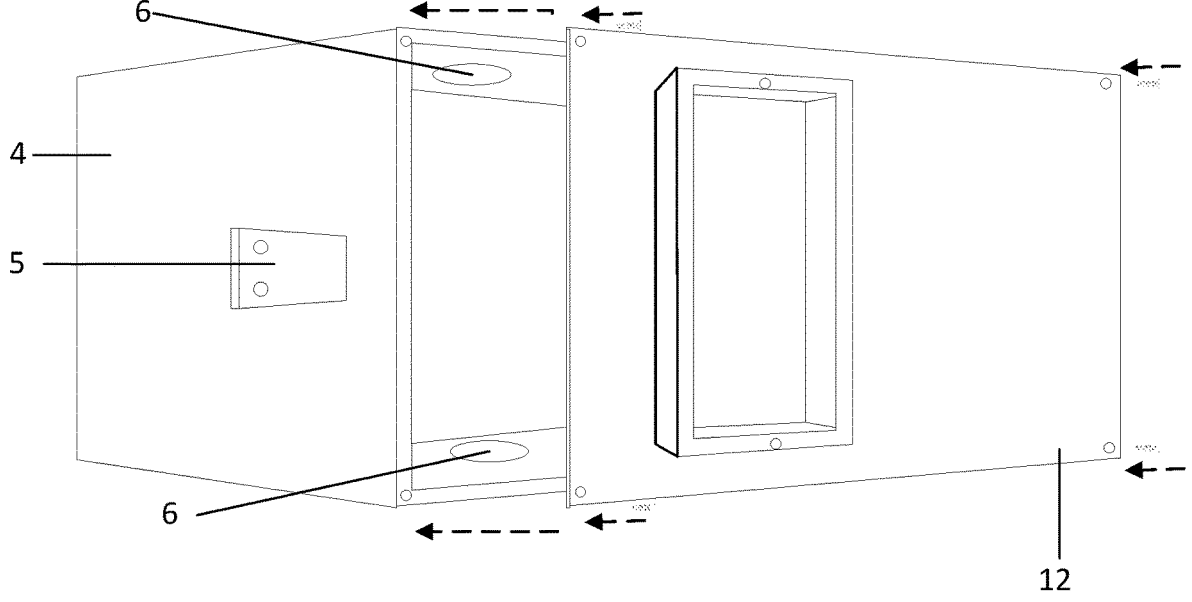
FIG. 9 illustrates an exploded view of the junction box of FIG. 2 and the drywall mud ring of FIG. 7 in accordance with an embodiment of the present invention.

Referring to FIG. 9 the mud ring (12) and junction box (4) are shown in exploded view to demonstrate the connection of the mud ring (12) to the junction box (4) by means of a plurality of screws for a secure connection.

Figure 10:
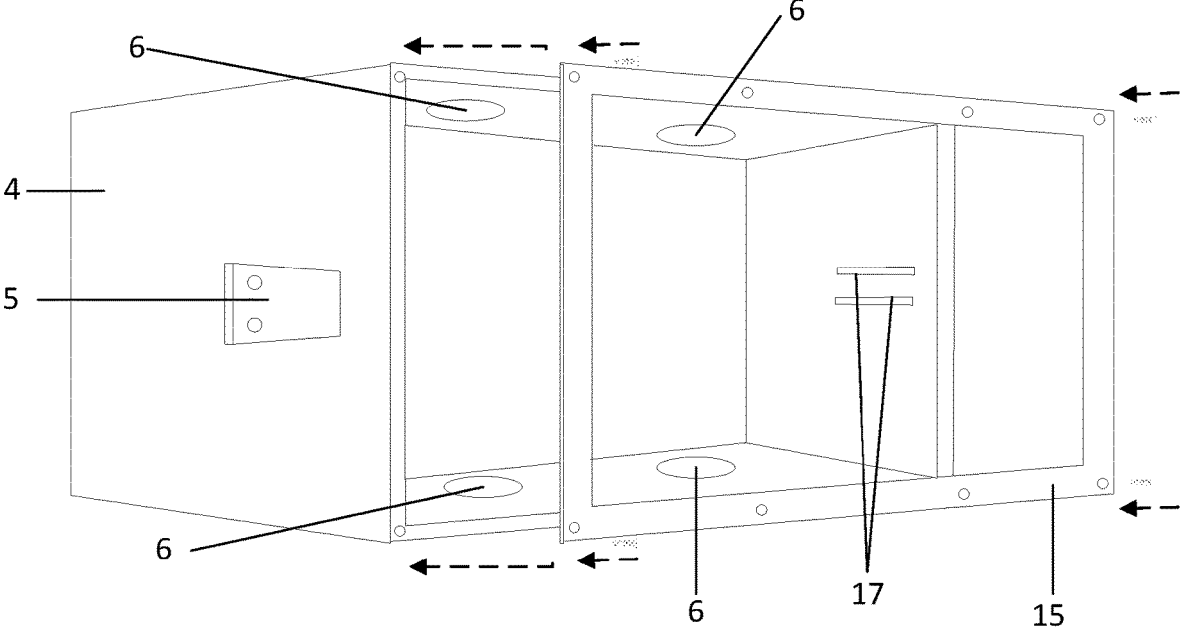
FIG. 10 illustrates an exploded view of the junction box of FIG. 2 and the drywall adapter plate of FIG. 8 in accordance with an embodiment of the present invention.

Referring to FIG. 10 the drywall adapter plate (15) and junction box (4) are shown in exploded view to demonstrate the connection of the drywall adapter plate (15) to the junction box (4) by means of a plurality of screws for a secure connection.

Referring to FIG. 11 the expandable/retractable flexible conduit (3), oval in circumference, is shown in orthogonal view approximately 5.08 cm (two inches) in diameter and an overall circumference of 15.96 cm (6.28319 inches) and approximately 60.96 cm (twenty-four inches) in height in a retracted position and demonstrates that the flexible conduit (3) can be retracted for small spaces. The flexible conduit (3) may be made of pvc plastic, but other materials may also be suitable. The flexible conduit may contain a flexible, spiral coil to allow for ease of expansion and retraction. The proximal and distal ends of the flexible conduit (3) include an attachment (13) approximately 0.7938 cm (five sixteenths of an inch) in height and with an inner diameter of approximately 5.08 cm (two inches) and an overall circumference of 15.96 cm (6.28319 inches), and an outer diameter of approximately 5.715 cm (two and a quarter inches) and an overall circumference of 17.954 cm (7.06858 inches), allowing the attachment (13) to fit flush with the cap (8) of the junction box (4) and to fit flush with the ninety-degree elbow (1) and connected together by the fasteners (9) (14) to maintain firm and consistent attachment and prevent accidental loss of connection.

Referring to FIG. 11A the expandable/retractable flexible conduit (3) is shown in orthogonal view approximately 5.08 cm (two inches) in diameter and an overall circumference of 15.96 cm (6.28319 inches) and approximately 121.92 cm (forty-eight inches) in height in an expanded position and demonstrates that the flexible conduit (3) can be expanded for greater lengths as required by the scope of work.

Referring to FIG. 12 the expandable, flexible conduit (3) and junction box (4) are shown in exploded view to demonstrate the connection to the junction box (4) and attachment (13) by means of fasteners (9) attached to the caps (8) for a secure connection.

Referring to FIG. 12A, the expandable, flexible conduit (3) and the junction box (4) are shown in side orthogonal view to demonstrate the completed connection by means of fasteners (9).

Referring to FIG. 13, the floor and/or ceiling plates (2) with the ninety-degree elbows (1) are shown in orthogonal view. The ceiling/floor plates may be made of pvc plastic, but other materials may also be suitable. The plate (2) has a plurality of openings, oval in circumference, approximately 5.8737 cm (two and five sixteenths inches) in diameter and an overall circumference of 18.453 cm (7.26493 inches) and is attachable to either the floor or ceiling by means of four threaded holes, one in each corner for screws, as to meet the scope of work and is not limited in location. The ninety-degree elbows (1), oval in circumference, have an outer diameter of approximately 5.715 cm (two and one quarter inches) and an overall circumference of 17.954 cm (7.06858 inches), and an inner diameter of approximately 5.08 cm (two inches) and an overall circumference of 15.96 cm (6.28319 inches), and fit through the oval opening of the ceiling/floor plate (2) and connect to the expandable/retractable flexible conduit (3) by means of the fasteners (14) approximately 0.635 cm (one-quarter inch) in width and approximately 0.3175 cm (one-eighth inch) in thickness and approximately 2.2225 cm (seven-eighths inches) in height, on each side of the elbows (1) to prevent accident loss of connection. The ninety-degree elbows (1) may be made of pvc plastic, but other materials may also be suitable. The assembly of this portion of the system is dynamic to meet the demands of the required scope of work.

Referring to FIG. 14 the floor and/or ceiling plates (2) are shown in orthogonal view to demonstrate the opening of the ninety-degree elbow (1) in which the cables/fiber/av/electrical wiring can be fed through to the expandable/retractable flexible conduit (3) and to the junction box (4). The oval openings (6) have breakouts in place to prevent air flow or debris in an unused portion of the system.

Referring to FIG. 15 the floor and/or ceiling plates (2) and ninety-degree elbow (1) is shown in side orthogonal view to give another representation of this portion of the system, to demonstrate the dynamic nature of installation as based on the scope of work. The fasteners (14) are shown attached to the ninety-degree elbow (1), as a solid piece, to attach to the expandable/retractable flexible conduit (3) to prevent accidental loss of connection.

Referring to FIG. 16, the expandable, flexible conduit (3) and ninety-degree elbow (1) are shown in exploded view to demonstrate the connection to the ninety-degree elbow (1) by means of fasteners (14) attached to the ninety-degree elbow (1) for a secure connection.

Referring to FIG. 16A, the expandable, flexible conduit (3) and the ninety-degree elbow (1) are shown in side orthogonal view to demonstrate the completed connection by means of fasteners (14).

Referring to FIG. 17 the ceiling and/or floor plate is shown in orthogonal view to demonstrate the oval openings (6) in which the ninety-degree elbows (1) are inserted. Breakouts are in place for aesthetic purposes as well as to prevent air flow or debris in an unused portion of the system.

Referring to FIG. 17A the ceiling and/or floor plate is shown in perspective view to demonstrate the oval openings (6) in which the ninety-degree elbows (1) are inserted. Breakouts are in place for aesthetic purposes as well as to prevent air flow or debris in an unused portion of the system.

Referring to FIG. 18 the embodiment of an improvement on a cover plate (16) for the junction box (4) is shown in orthogonal view. The cover plate may be made of pvc plastic but other materials may also be suitable. This is one, non-limiting, option of a cover plate to fit the junction box (4) of the In-wall Universal Pathway system. Shown in this example are four keystone jack ports, two HDMI ports and an AV port.

Referring to FIG. 19 the embodiment of an improvement on the cover plate (16) for the junction box (4) is shown in orthogonal view. The cover plate may be made of pvc plastic but other materials may also be suitable. This is one, non-limiting, option of a cover plate to fit the junction box (4) of the In-wall Universal Pathway system. Shown in this example are three keystone jack ports, two HDMI ports, an AV port, and two electrical outlets.

Referring to FIG. 20 the embodiment of an improvement on the cover plate (16) for the junction box (4) is shown in orthogonal view. The cover plate may be made of pvc plastic but other materials may also be suitable. This is one, non-limiting, option of a cover plate to fit the junction box (4) of the In-wall Universal Pathway system. Shown in this example are four keystone jack ports, one HDMI port, an AV port, and two electrical outlets.

Referring to FIG. 21 the embodiment of an improvement on the cover plate (16) for the junction box (4) is shown in orthogonal view. The cover plate may be made of pvc plastic but other materials may also be suitable. This is one, non-limiting, option of a cover plate to fit the junction box (4) of the In-wall Universal Pathway system. Shown in this example are six keystone jack ports, one HDMI port, one AV port, and two electrical outlets.

Referring to FIG. 22, the embodiment of the entire In-wall Universal Pathway system installed in the wall and in the floor, with a plurality of flexible conduits (3) expanded to the desired height and length as to meet the demand of a single installation, without limitation.

Referring to FIG. 23, the embodiment of the entire In-wall Universal Pathway system installed in the ceiling, wall, and the floor, with a plurality of flexible conduits (3) expanded to the desired height and length as to meet the demand of a single installation, without limitation It will be readily apparent to anyone who reads this document that at least one embodiment of the in-wall Universal Pathway system provides for a wide variety of multimedia and data cabling installation in the same junction box and is non limiting. Although only certain embodiments were disclosed in this document, many other variations are possible. For example, the preferred materials include, but are not limited to, pvc plastic or other light-weight durable material for the ninety-degree elbows (1), ceiling/floor plates (2), junction box (4), cap attachments (8), fasteners (9) (14), junction box divider (11), and attachment pieces on expandable/retractable flexible conduit (11). The preferred materials for the brackets (5) is galvanized steel for a secure attachment to the wall studs. The preferred material for the expandable/retractable flexible conduit (3) is of flexible plastic with an internal structure that allows for expansion or retraction to retain its shape when expanded or retracted. The use of plastic for all or some of the components minimizes or eliminates adverse effects on the Specific Absorption Rate, also known as SAR, of radio frequency energy.

The junction box (4) size is non-limiting in nature and can range from a variety of widths to fit between wall studs in a typical wall structure. The height is also non-limiting in nature and varies as based on the scope of work. The bracket (5) size is non-limiting in length to allow for secure attachment to cover a majority of wall studs on either side of the junction box (4). The height of the bracket (5) will be no less than 5.08 cm (2 inches) to allow for secure attachment to wall studs on either side of the junction box (4). The ceiling and/or floor plates (2) size is non-limiting in nature to allow for secure attachment to the ceiling and/or floor and the expandable/retractable flexible conduit (3). The ninety-degree elbow (1) size is non-limiting in size to allow for a large bundle of fibers, cables, and electrical wiring and will be no less than 5.08 cm (two inches) in diameter. The expandable/retractable flexible conduit (3) size is non-limiting in size to allow for a large bundle of fibers, cables, and electrical wiring and will be no less than 5.08 cm (two inches) in diameter. The elements of design that are new and patent worthy are the universality of the junction box (4) to allow for a large bundle of fibers, cables, and/or electrical wiring. The junction box is designed to be set in wall and oversized to accommodate for a large bundle of fibers, cables, and/or electrical wiring. The design of the brackets (5) is new and patent worthy as it is designed to allow for the adjustment of the junction box (4) to correspond to the depth of the wall covering. The oval breakouts (6) in the junction box (4) are new and patent worthy given their size of no less than 5.08 cm (two inches) in diameter, and oval in circumference, to accommodate for a large bundle of fibers, cables, and/or electrical wiring. The improvement on an existing mud ring (12) is new and patent worthy as it is designed to fit the oversized junction box (4) while the opening is designed to fit current models of faceplates. The drywall adapter plate (15) is new and patent worthy as it is designed to fit the oversized junction box (4) while the opening is designed to fit the improvement of a faceplate (16) which offers more connections in one location. The expandable/retractable flexible conduit (3) is new and patent worthy given the dynamic nature of the part. This allows for installation in small or large areas based on the scope of the project to reach floor to ceiling as needed. There is no prior art nor any product on the market in the structured cabling field that allows for a semi-rigid flexible conduit to allow for a non-limiting installation of fibers, cables, and/or electrical wiring. The In-wall Universal Pathway system is new and patent worthy, as a whole, given the dynamic nature of the system to allow for ease of installation of a new build as well as future expansion including but not limited to network fibers, cables, and/or electrical wiring. The ability of the junction box (4) to be placed at any height on a wall is also another reason this idea is new and patent worthy. Current systems allow only for a set installation above floor level and any future expansion requires invasive structural changes. Alternative structures for the In-wall Universal Pathway system include the faceplates (16) which are an improvement of a previous design, that cover the open face of the junction box (4) after cables, fibers, and/or electrical wiring is in place. The size of the faceplate (16) is non-limiting and is determined by the size of the junction box used for installation per the requirements of the job specification. The faceplates (16) can be modified to fit any scope of work desired at the site. An additional alternative structure for the In-Wall Universal Pathway system includes mud rings (12) which are an improvement of a previous design, that cover the open face of the junction box (4) after cables, fibers, and/or electrical wiring is in place. The size of the mud ring (12) is non-limiting and is determined by the size of the junction box used for installation per the requirements of the job specification. An additional alternative structure for the In-Wall Universal Pathway system include the drywall attachment ring (15) that covers the open face of the junction box (4) after cables, fibers, and/or electrical wiring is place. The size of the drywall adapter ring (15) is non-limiting and is determined by the size of the junction box used for installation per the requirements of the job specification.

Although specific features, structures, embodiments, methods, objectives, benefits, advantages, functionalities, and applications may have been disclosed, it will be understood by those having skill in the art that changes, including but not limited to, variations, modifications, combinations, alterations, omissions, and various other applications, will occur to those of ordinary skill in the art and such changes will be made without departing from the spirit and the scope of the invention as claimed. Further, it is to be understood by anyone who reads this document that the terminology and phraseology used herein are for the purpose of description and should not be considered limiting. Even further, the drawings illustrating embodiments of the present invention are used for schematic representation. The actual systems, devices, and methods of the embodiments of the present invention may depart from the foregoing schematics without departing from the spirit or the scope of the present invention.

What is claimed is:

1. An in-wall universal pathway system for managing structured cable, the system comprising:
   a plurality of oversized junction boxes configured to housing a plurality of network and/or electrical cables;
   a plurality of retaining brackets to secure the junction box in place;
   a plurality of dividers for use within the oversized junction box;
   a plurality of drywall adapter rings for use with the junction box;
   a plurality of fasteners for secure connections to the oversized junction box and expandable, flexible conduit;
   a plurality of expandable, flexible conduit configured for management of a plurality of network and/or electrical cables;
   a plurality of ninety-degree elbows configured for management of a plurality of network and/or electrical cables to the expandable, flexible conduit;

a plurality of fasteners for secure connections to the ninety-degree elbows and expandable, flexible conduit; and
   a plurality of ceiling and floor plates for securing the system in place.

2. The oversized junction box of claim 1, wherein is composed a box of pvc plastic, rectangular or square shape, consisting of five solid side portions with one front facing open side.

3. The oversized junction box of claim 2, wherein is comprised a plurality of threaded holes in the corners of the front facing open side of said junction box.

4. The retaining brackets of claim 1, comprised of galvanized steel and square or rectangular in shape and includes a nut and bolt component to secure the brackets to the junction box and is adjustable with a plurality of predrilled holes for securing said brackets to a structure.

5. The divider of claim 1 wherein is comprised of pvc plastic is provided for optional use within said oversized junction box.

6. The oversized junction box of claim 2, wherein is cut a groove on the interior of said oversized junction box for the insertion of the divider ranging in size in proportion to said oversized junction box.

7. The oversized junction box of claim 2, wherein is cut a plurality of rectangular openings on the side portions of said junction box to allow for the adjustment of the depth of the junction box corresponding to the wall depth.

8. The oversized junction box of claim 2, wherein the upper and lower surfaces contain a plurality of openings, oval in circumference and includes breakout portions as needed.

9. The oversized junction box of claim 2, wherein are caps oval in circumference composed of pvc plastic and assembled to said oversized junction box as solid single piece of said oversized junction box.

10. The caps of claim 8 wherein are a plurality of fasteners composed of pvc plastic assembled to said caps as a solid piece.

11. The drywall adapter ring of claim 1 wherein is composed of pvc plastic and assembled to oversized junction box.

12. The expandable, flexible conduit of claim 1 wherein is composed of pvc rubber and is oval in circumference.

13. The expandable, flexible conduit of claim 12 wherein is composed of rigid coiled wire of accordion shape.

14. The expandable, flexible conduit of claim 12 wherein are attachments, composed of pvc 65 plastic and oval in circumference and assembled to each end of said expandable, flexible conduit as a solid single piece of said expandable, flexible conduit to be coupled to the oversized junction box.

15. The ninety-degree elbows of claim 1 wherein are composed of pvc plastic and are oval in circumference.

16. The ninety-degree elbows of claim 15 wherein are a plurality of fasteners composed of pvc plastic assembled to said ninety-degree elbows as a solid piece to be coupled to the expandable, flexible conduit.

17. The ceiling and floor plates of claim 1 wherein are composed of pvc plastic and wherein are a plurality of openings oval in circumference and includes breakout portions as needed and in communication with the ninety-degree elbows.

18. The ceiling and floor plates of claim 17 wherein is comprised a plurality of threaded holes in the corners of said ceiling and floor plate.

* * * * *